(12) United States Patent
Danley et al.

(10) Patent No.: US 9,880,362 B2
(45) Date of Patent: Jan. 30, 2018

(54) METHODS OF SECURING ONE OR MORE OPTICAL FIBERS TO A FERRULE

(71) Applicant: CORNING OPTICAL COMMUNICATIONS LLC, Hickory, NC (US)

(72) Inventors: Jeffrey Dean Danley, Hickory, NC (US); Robert Bruce Elkins, II, Hickory, NC (US); Thomas Dale Ketcham, Horseheads, NY (US); Darrin Max Miller, Hickory, NC (US); Robert Michael Morena, Lindley, NY (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 470 days.

(21) Appl. No.: 14/686,061

(22) Filed: Apr. 14, 2015

(65) Prior Publication Data

US 2015/0219860 A1    Aug. 6, 2015

Related U.S. Application Data

(63) Continuation-in-part of application No. PCT/US2014/069223, filed on Dec. 9, 2014, and a
(Continued)

(51) Int. Cl.
*G02B 6/38*     (2006.01)
*G02B 6/32*     (2006.01)
*B29C 65/16*    (2006.01)

(52) U.S. Cl.
CPC ......... *G02B 6/3855* (2013.01); *G02B 6/3854* (2013.01); *B29C 65/16* (2013.01); *G02B 6/32* (2013.01)

(58) Field of Classification Search
CPC .......... G02B 6/32; G02B 6/3855; B29C 65/16
(Continued)

(56) References Cited

U.S. PATENT DOCUMENTS

| 3,501,048 A | 3/1970 | Strickland et al. ............ 220/83 |
| 4,147,402 A | 4/1979 | Chown ..................... 350/96.18 |

(Continued)

FOREIGN PATENT DOCUMENTS

| EP | 0285784 A1 | 10/1988 | ............ G02B 6/38 |
| EP | 0297666 A2 | 1/1989 | ............ G02B 6/38 |

(Continued)

OTHER PUBLICATIONS

Cook, R. F., "Toughening of a Cordierite Glass-Ceramic by Compressive Surface Layers," *Journal of American Ceramic Society*, 2005, 88(10), pp. 2798-2808.
(Continued)

*Primary Examiner* — Carson Gross
(74) *Attorney, Agent, or Firm* — Adam R. Weeks

(57) ABSTRACT

A method of securing an optical fiber to a ferrule involves heating the ferrule to cause thermal expansion. A ferrule bore of the ferrule increases in diameter as a result of the thermal expansion, and an optical fiber is inserted into the ferrule bore. The ferrule is then cooled so that the ferrule bore decreases in diameter and forms a mechanical interface with the optical fiber. Finally, the optical fiber is fused to the ferrule by irradiating the optical fiber and the ferrule with laser energy.

18 Claims, 15 Drawing Sheets

Related U.S. Application Data continuation-in-part of application No. PCT/US2013/063998, filed on Oct. 9, 2013.

(60) Provisional application No. 61/917,765, filed on Dec. 18, 2013, provisional application No. 61/716,815, filed on Oct. 22, 2012.

(58) Field of Classification Search
USPC ....... 156/272.8; 65/392, 406; 385/60, 80, 81
See application file for complete search history.

(56) References Cited

U.S. PATENT DOCUMENTS

| | | | |
|---|---|---|---|
| 4,345,930 A | 8/1982 | Basola et al. .................. 65/102 |
| 4,510,005 A | 4/1985 | Nijman ......................... 156/221 |
| 4,678,268 A | 7/1987 | Russo et al. ............... 350/96.18 |
| 4,781,970 A | 11/1988 | Barbee et al. ................. 428/210 |
| 4,834,569 A | 5/1989 | Foote et al. ...................... 403/2 |
| 4,859,827 A | 8/1989 | Coyle, Jr. et al. ........ 219/121.64 |
| 4,869,571 A | 9/1989 | Hübner et al. .............. 350/96.2 |
| 4,932,989 A | 6/1990 | Presby ............................... 65/2 |
| 5,011,254 A | 4/1991 | Edwards et al. ........... 350/96.18 |
| 5,042,895 A | 8/1991 | Chouinard et al. ............. 385/2 |
| 5,101,090 A | 3/1992 | Coyle, Jr. et al. ........ 219/121.68 |
| 5,226,101 A | 7/1993 | Szentesi et al. ................ 385/85 |
| 5,250,351 A | 10/1993 | Presby .................... 219/121.69 |
| 5,291,570 A | 3/1994 | Filgas et al. .................... 385/78 |
| 5,317,661 A | 5/1994 | Szentesi et al. ................ 385/31 |
| 5,421,928 A | 6/1995 | Knecht et al. ................ 156/153 |
| 5,559,909 A | 9/1996 | Anderson et al. .............. 385/16 |
| 5,682,453 A | 10/1997 | Daniel et al. ................... 385/99 |
| 5,772,720 A | 6/1998 | Taira-Griffin et al. ......... 65/387 |
| 5,815,619 A | 9/1998 | Bloom ............................ 385/78 |
| 5,954,974 A | 9/1999 | Broer et al. ...................... 216/2 |
| 5,966,485 A | 10/1999 | Luther et al. ................... 385/85 |
| 6,000,858 A * | 12/1999 | Bloom ................ G02B 6/2551 |
| | | | 385/94 |
| 6,139,196 A | 10/2000 | Feth et al. ....................... 385/97 |
| 6,170,995 B1 | 1/2001 | Mitachi et al. ................. 385/78 |
| 6,246,026 B1 | 6/2001 | Vergeest .................. 219/121.72 |
| 6,276,842 B1 | 8/2001 | Xu et al. .......................... 385/85 |
| 6,282,348 B1 | 8/2001 | Carlisle et al. ................. 385/78 |
| 6,282,349 B1 | 8/2001 | Griffin ............................ 385/81 |
| 6,361,219 B1 | 3/2002 | Blyler, Jr. et al. ............. 385/85 |
| 6,413,450 B1 | 7/2002 | Mays, Jr. ..................... 264/1.27 |
| 6,416,235 B1 | 7/2002 | Rabinovich ................... 385/78 |
| 6,509,547 B1 | 1/2003 | Bernstein et al. ........ 219/121.68 |
| 6,534,741 B2 | 3/2003 | Presby .................... 219/121.69 |
| 6,643,446 B2 | 11/2003 | Moidu et al. ................. 385/138 |
| 6,738,554 B2 | 5/2004 | Culbert et al. ................. 385/33 |
| 6,742,936 B1 | 6/2004 | Knecht et al. .................. 385/67 |
| 6,774,341 B2 | 8/2004 | Ohta ......................... 219/121.72 |
| 6,805,491 B2 | 10/2004 | Durrant et al. ................. 385/76 |
| 6,817,785 B2 | 11/2004 | Tian ................................ 385/96 |
| 6,822,190 B2 | 11/2004 | Smithson et al. ........ 219/121.69 |
| 6,825,440 B2 | 11/2004 | Ohta et al. ............... 219/121.69 |
| 6,886,991 B2 | 5/2005 | Endo ............................... 385/78 |
| 6,888,987 B2 | 5/2005 | Sercel et al. .................... 385/39 |
| 6,902,327 B1 | 6/2005 | Johnson .......................... 385/60 |
| 6,939,055 B2 | 9/2005 | Durrant et al. ................. 385/76 |
| 6,951,994 B2 | 10/2005 | Mays, Jr. ................. 219/121.67 |
| 6,955,478 B2 | 10/2005 | Durrant et al. ................. 385/76 |
| 6,957,920 B2 | 10/2005 | Luther et al. ................... 385/85 |
| 6,960,627 B2 | 11/2005 | Huth et al. .................... 525/109 |
| 6,963,687 B2 | 11/2005 | Vergeest et al. ............. 385/123 |
| 6,968,103 B1 | 11/2005 | Schroll et al. ................. 385/30 |
| 7,023,001 B2 | 4/2006 | Cournoyer et al. ........ 250/492.1 |
| 7,029,187 B2 | 4/2006 | Chapman et al. .............. 385/96 |
| 7,082,250 B2 | 7/2006 | Jones et al. .................... 385/134 |
| 7,142,741 B2 | 11/2006 | Osborne ......................... 385/15 |
| 7,147,384 B2 | 12/2006 | Hardcastle et al. ............ 385/60 |
| 7,216,512 B2 | 5/2007 | Danley et al. ................ 65/392 |
| 7,264,403 B1 | 9/2007 | Danley et al. ................. 385/60 |
| 7,267,491 B2 | 9/2007 | Luther et al. ................... 385/85 |
| 7,306,376 B2 | 12/2007 | Scerbak et al. ................. 385/76 |
| 7,324,723 B2 | 1/2008 | Shioda et al. .................. 385/31 |
| 7,324,724 B2 | 1/2008 | Levesque et al. ............. 385/31 |
| 7,377,700 B2 | 5/2008 | Manning et al. ............... 385/72 |
| 7,419,308 B2 | 9/2008 | Ma ................................. 385/54 |
| 7,509,004 B2 | 3/2009 | Coleman ........................ 385/33 |
| 7,540,668 B2 | 6/2009 | Brown ........................... 385/78 |
| 7,630,609 B1 | 12/2009 | Mays, Jr. et al. ............. 385/137 |
| 7,695,201 B2 | 4/2010 | Douglas et al. ................ 385/85 |
| 7,802,927 B2 | 9/2010 | Benjamin et al. ............. 385/88 |
| 8,052,836 B2 | 11/2011 | Cale et al. .................... 156/712 |
| 8,101,885 B2 | 1/2012 | Nakamae et al. ........ 219/121.77 |
| 8,104,974 B1 | 1/2012 | Gurreri ........................... 385/72 |
| 8,109,679 B2 | 2/2012 | Danley et al. .................. 385/85 |
| 8,123,417 B2 | 2/2012 | Wertman et al. ............... 385/78 |
| 8,132,971 B2 | 3/2012 | Luther et al. ................... 385/83 |
| 8,215,850 B2 | 7/2012 | Yalamanchili et al. ........ 385/94 |
| 8,840,318 B2 | 9/2014 | Baca et al. ..................... 385/62 |
| 9,205,609 B1 | 12/2015 | Danley et al. |
| 9,205,610 B1 | 12/2015 | Danley |
| 2002/0110332 A1* | 8/2002 | Clarkin ................ C03B 23/047 |
| | | | 385/78 |
| 2003/0099453 A1 | 5/2003 | Moidu et al. ................ 385/138 |
| 2003/0174974 A1 | 9/2003 | Yasuda et al. .................. 385/80 |
| 2003/0223712 A1 | 12/2003 | Chapman et al. .............. 385/96 |
| 2004/0234211 A1 | 11/2004 | Durrant et al. ................. 385/88 |
| 2005/0008307 A1 | 1/2005 | Culbert et al. ................ 385/123 |
| 2005/0185901 A1 | 8/2005 | Inoue et al. .................... 385/96 |
| 2005/0284852 A1 | 12/2005 | Vergeest et al. ......... 219/121.67 |
| 2006/0137403 A1 | 6/2006 | Barr et al. ...................... 65/377 |
| 2006/0266743 A1 | 11/2006 | Chi et al. ................. 219/121.69 |
| 2007/0172174 A1 | 7/2007 | Scerbak et al. ................. 385/76 |
| 2008/0067158 A1 | 3/2008 | Levesque ................. 219/121.72 |
| 2010/0101277 A1 | 4/2010 | Gonthier et al. ............... 65/392 |
| 2010/0215319 A1 | 8/2010 | Childers et al. ................ 385/60 |
| 2010/0303416 A1 | 12/2010 | Danley et al. .................. 385/55 |
| 2011/0235973 A1 | 9/2011 | Acuna ............................ 385/38 |
| 2012/0014649 A1 | 1/2012 | Duis et al. ...................... 385/65 |
| 2012/0027356 A1 | 2/2012 | Gurreri .......................... 385/60 |
| 2012/0027358 A1 | 2/2012 | Webb et al. .................... 385/78 |
| 2014/0099060 A1 | 4/2014 | Danley et al. |

FOREIGN PATENT DOCUMENTS

| | | | |
|---|---|---|---|
| EP | 520902 | 9/1996 | |
| EP | 0866347 A1 | 9/1998 | .............. G02B 6/00 |
| GB | 2322327 A | 8/1998 | .............. B28B 1/26 |
| JP | 54-21749 A | 2/1972 | .............. G02B 5/14 |
| WO | 98/26317 A1 | 6/1998 | .............. G02B 6/38 |
| WO | 01/61394 A1 | 8/2001 | .............. G02B 6/26 |
| WO | 01/61395 A1 | 8/2001 | .............. G02B 6/26 |
| WO | 01/61870 A2 | 8/2001 | |
| WO | 2004/003612 A1 | 1/2004 | .............. G02B 6/25 |
| WO | 2007/005313 A1 | 1/2007 | .............. A61C 1/08 |
| WO | 2008/103239 A1 | 8/2008 | ............. B23K 26/00 |
| WO | 2009/062894 A1 | 5/2009 | .............. G02B 6/40 |

OTHER PUBLICATIONS

Dietz, R. L., "Optical fiber sealing with solder glass: Design Guidelines," *Proceedings of SPIE*, 2004, vol. 5578, pp. 642-651.

Accuratus, "Zirconium Oxide, ZrO2. Ceramic Properties," XP-002711172, Retrieved on Aug. 8, 2013 from http://accuratus.com/zire.html—1 page.

Heraeus, "Thermal properties," XP-0002711171, Retrieved on Aug. 9, 2013 from http://heraeus-quarzglas.com/en/quarzglas/thermalproperties/Thermal_properties.aspx—1 page.

Patent Cooperation Treaty, International Search Report for PCT/US2014/069223, dated Feb. 26, 2015, 9 pages.

Danley et al.; "Automated Optical Fiber Termination Process"; U.S. Appl. No. 13/771,764, filed Feb. 20, 2013.

\* cited by examiner

METHODS OF SECURING ONE OR MORE OPTICAL FIBERS TO A FERRULE

CROSS-REFERENCE TO RELATED APPLICATIONS

This application is a continuation-in-part of International Application No. PCT/US2014/069223, filed on Dec. 9, 2014, which claims the benefit of priority to U.S. Provisional Patent Application No. 61/917,765, filed on Dec. 18, 2013, both applications being incorporated herein by reference. This application is also a continuation-in-part of International Application No. PCT/US2013/063998 ("the '998 PCT application"), filed on Oct. 9, 2013, which claims the benefit of priority to both U.S. patent application Ser. No. 13/790,440, filed on Mar. 8, 2013, and U.S. Provisional Patent Application No. 61/713,815, filed on Oct. 15, 2012, the '998 PCT application being incorporated herein by reference.

BACKGROUND

The disclosure relates generally to optical fibers and more particularly to methods of securing one or more optical fibers to a ferrule of a fiber optic connector.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another fiber optic connector or adapter, an optical fiber in the ferrule is positioned in a known, fixed location relative to the housing. This allows an optical connection to be established when the optical fiber is aligned with another optical fiber provided in the mating component (the other fiber optic connector or adapter).

To minimize signal attenuation through such an optical connection, the optical fiber should not move relative to the ferrule. Doing so might alter the precise spatial relationship of the optical fiber and ferrule and, in turn, affect alignment/mating with the optical fiber of the mating component. Conventional methods of preventing movement involves bonding the optical fiber in a bore of the ferrule with an epoxy-based adhesive ("epoxy"). Although relatively inexpensive, epoxy presents several challenges. For example, epoxy can be difficult to apply uniformly to all ferrules such that the quality of adhesive bond may vary. The spatial relationship of the optical fiber relative to the ferrule may then be difficult to predict. The need for precise mixing, a limited pot life after mixing, and long cure times after application are other challenges that epoxy typically presents.

SUMMARY

Methods of securing an optical fiber to a ferrule are described below. The optical fiber could be a single optical fiber or one of several optical fibers, as may be the case for a multi-fiber connector, to be secured to the ferrule. Thus, "an optical fiber" refers to at least one optical fiber. According to one embodiment, the method involves heating the ferrule to cause thermal expansion. A ferrule bore of the ferrule increases in diameter as a result of the thermal expansion, and an optical fiber is inserted into the ferrule bore. The ferrule is then cooled so that the ferrule bore decreases in diameter and forms a mechanical interface with the optical fiber. Finally, the optical fiber is fused to the ferrule by irradiating the optical fiber and the ferrule with laser energy.

Another embodiment involves the same steps mentioned above, but specifically involves heating the ferrule with at least one laser to cause the thermal expansion. The at least one laser is also what is used to irradiate the optical fiber and the ferrule with laser energy to fuse the optical fiber to the ferrule. However, fusing may be performed after changing at least one optical delivery property of the at least one laser.

Additional features and their advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of optical connectivity will appreciate how features and attributes associated with embodiments shown in one of the drawings may be applied to embodiments shown in others of the drawings.

DETAILED DESCRIPTION

Figure 1:
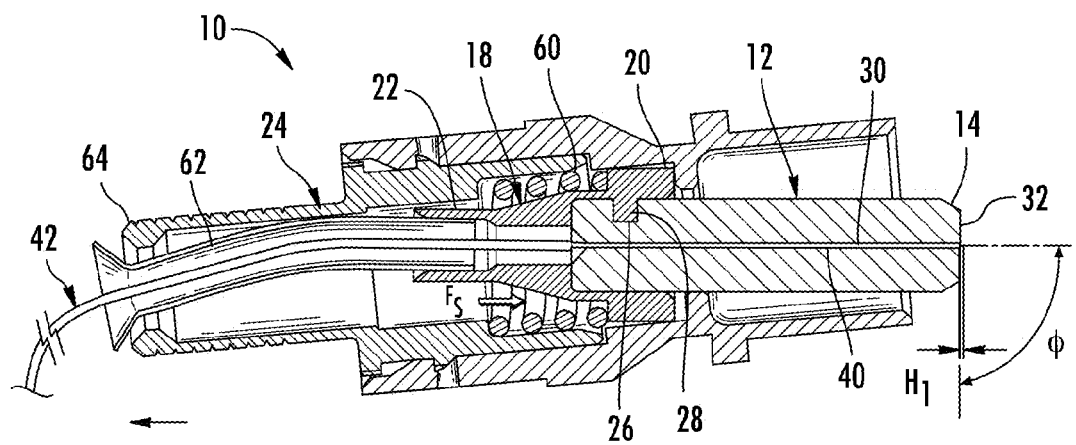
FIG. 1 a cross-sectional view of an example of a fiber optic connector having a ferrule to which an optical fiber is secured according to methods of the present disclosure.

Various embodiments will be further clarified by examples in the description below. In general, the description relates to methods of securing an optical fiber in a ferrule of a fiber optic connector. The methods may be part of a cable assembly process for a fiber optic cable. That is, the methods may be part of terminating one or more optical fibers from a fiber optic cable with a fiber optic connector to form a cable assembly. One example of a fiber optic connector ("connector") 10 for such a cable assembly is shown in FIG. 1. Although the connector 10 is shown in the form of a SC-type connector, the methods described below may be applicable to processes involving different fiber optic connector designs. This includes ST, LC, FC, MU, and MPO-type connectors, for example, and other single-fiber or multi-fiber connector designs.

Figure 2:
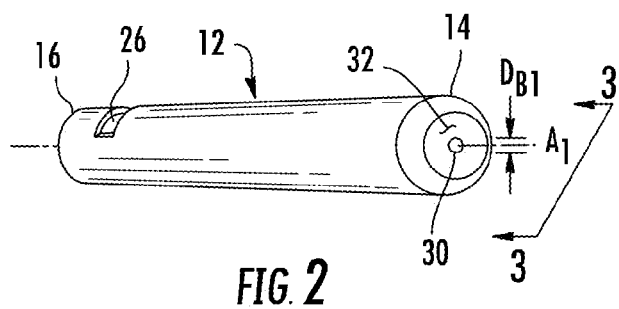
FIG. 2 is a perspective view of the ferrule of FIG. 1.
Figure 3:
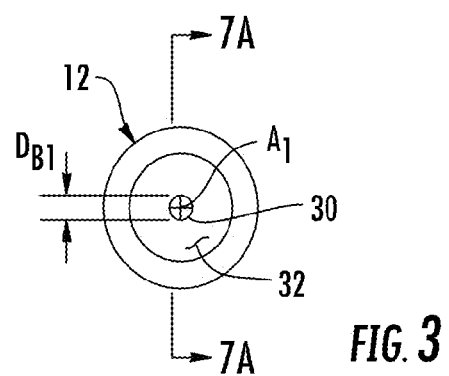
FIG. 3 is a front elevation view of the ferrule of FIG. 1.

Referring FIGS. 1-3, the connector 10 includes a ferrule 12 having a first end 14 and a second end 16, a ferrule holder 18 having opposed first and second end portions 20, 22, and a housing 24. The second end 16 of the ferrule 12 is positioned in the first end portion 20 of the ferrule holder 18 while the first end 14 of the ferrule 12 remains outside the ferrule holder 18. The ferrule holder 18 may comprise, for example, a plastic material molded over the second end 16 of the ferrule 12, which may in turn comprise a ceramic material, such as zirconia. Other details related to possible constructions/compositions of the ferrule 12 and pertaining methods of the present disclosure will be set forth below. In embodiments where the ferrule holder 18 is molded, a notch 26 may be provided in the ferrule 12 so that a portion 28 of the ferrule holder 18 is disposed in the notch 26 to help prevent the ferrule 12 from disengaging with the ferrule holder 18. In alternative embodiments, the ferrule 12 may simply be press-fit into the ferrule holder 18, which may or may not be a molded component.

The ferrule 12 also includes a ferrule bore 30 ("microhole") extending between the first and second ends 14, 16. A center of the ferrule bore 30 defines an optical axis $A_1$, and the first end 14 of the ferrule 12 defines a front end face 32 positioned at an angle $\Phi$ relative to the optical axis $A_1$. The front end face 32 is shown as being orthogonal to the optical axis $A_1$ in the embodiment of FIG. 1 such that the angle $\Phi$ is 90°. In other embodiments, the front end face 32 may be non-orthogonal.

As shown in FIG. 1, an end portion of an optical fiber 40 may be inserted from a rear of the ferrule bore 30 and extended until the optical fiber 40 exits an opening of the ferrule bore 30 on the front end face 32 of the ferrule 12. Thus, the optical fiber 40 protrudes past the front end face 32 by a distance $H_1$ ("protrusion height"). Details relating to the how the optical fiber 40 may be inserted into and secured within the ferrule bore 32 will be described in greater detail below. In general, methods may be used that advantageously provide a mechanical interface between an inner surface of the ferrule bore 30 and an outer surface of the optical fiber 40 before fusing the optical fiber 40 to the ferrule 12, thereby avoiding the need for a bonding agent (e.g., epoxy).

Figure 4:
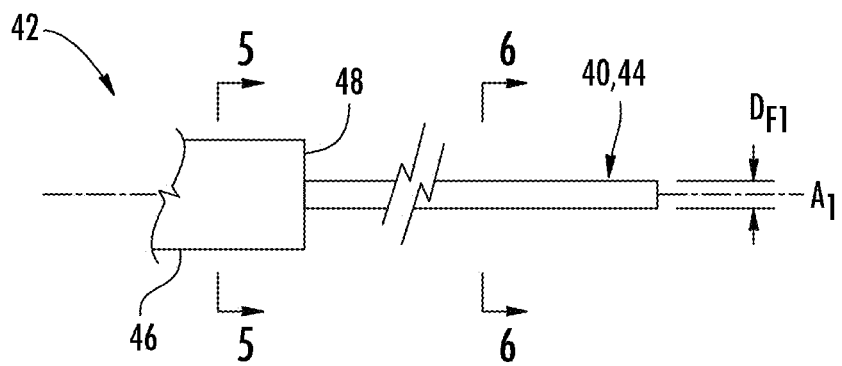
FIG. 4 is a schematic side view of a fiber optic cable that includes the optical fiber of FIG. 1.
Figure 5:
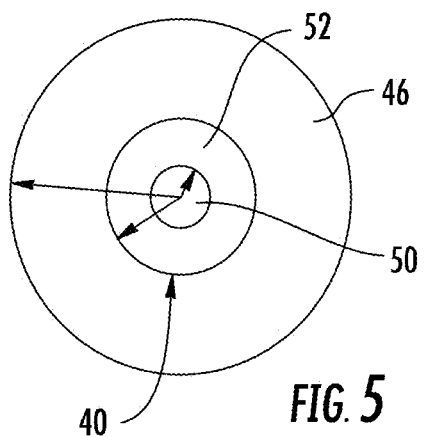
FIG. 5 is a cross-sectional view taken along lines 5-5 in FIG. 4.
Figure 6:
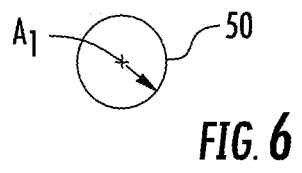
FIG. 6 is a cross-sectional view taken along lines 6-6 in FIG. 4.

The optical fiber 40 may be part of a fiber optic cable 42 upon which the fiber optic connector 10 is installed. As schematically shown in FIG. 4, the end portion (noted with reference number 44) of the optical fiber 40 is exposed from an outer jacket 44 that surrounds and protects other portions of the optical fiber 40. The end portion may represent part of a "bare" optical fiber portion in that the end portion is not only exposed from the outer jacket 44, but is also stripped or otherwise devoid of a primary coating up to a transition interface 48. In other words, and as shown in FIGS. 5 and 6, the optical fiber 40 includes a bare optical fiber portion 50, which may comprise silica, and a primary coating 52, which may comprise an acrylate polymer, within the outer jacket 46, which may comprise a polyurethane acrylic resin. The outer jacket 46 surrounds the optical fiber 40 (i.e., both the primary coating 52 and bare optical fiber portion 50) until the transition interface 48 (FIG. 4), where both the primary coating 52 and outer jacket 46 have been removed. Although the primary coating 52 is shown as being removed from the entire length of the optical fiber 40 extending from the outer jacket 46, in alternative embodiments the primary coating 52 may cover some of the length exposed from the outer jacket 46.

Referring back to FIG. 1, the second end portion 22 of the ferrule holder 18 is received in the housing 24. A spring 60 may be disposed around the second end portion 22 and configured to interact with walls of the inner housing 24 to apply a biasing force $F_S$ to the ferrule holder 18 (and ferrule 12). Additionally, a lead-in tube 62 may extend from a rear end 64 of the housing 24 to within the second end portion 22 of the ferrule holder 18 to help guide the insertion of the optical fiber 40 into the ferrule 12 during assembly (discussed below). An outer shroud 66 is positioned over the ferrule 12, ferrule holder 18, and housing 24, with the overall configuration being such that the front end face 32 of the ferrule 12 is configured to contact a mating component (e.g., another fiber optic connector; not shown).

In a manner not shown herein, the fiber optic cable 42 may include one or more layers of material (e.g., a strength layer of aramid yarn) that may be crimped onto the rear end 64 of the housing 24. A crimp band may be provided for this purpose. Additionally, a strain-relieving boot may be placed over the crimped region and extend rearwardly to cover a portion of the fiber optic cable 42. Variations of these aspects will be appreciated by persons skilled in the design of fiber optic cable assemblies. Again, the embodiment shown in FIG. 1 is merely an example of a fiber optic connector that may be used in the methods described below. The general overview has been provided simply to facilitate discussion.

Now that the fiber optic connector 10 has been introduced to facilitate discussion, exemplary methods of securing the optical fiber 40 to the ferrule 12 will now be described. A high-level description of one exemplary method for forming a mechanical interface will first be provided, followed by a more detailed description of each of the steps and variants thereof that may be part of other exemplary methods. The mechanical interface temporarily secures the optical fiber 40 to the ferrule 12. Afterwards, a permanent attachment/connection may be formed by fusing the optical ferrule 40 to the ferrule 12. A more detailed description of aspects relating to such fusing will be provided below following the description of aspects relating to forming the mechanical interface.

Figure 7A:
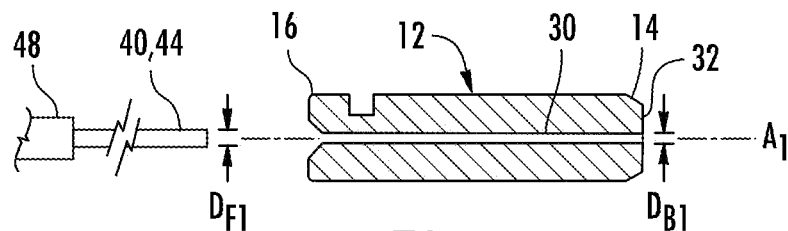
FIG. 7A is a schematic view of the ferrule of FIGS. 1-3 adjacent to the optical fiber of FIGS. 4-6, wherein the ferrule is shown as a cross-section taken along line 7A-7A in FIG. 3.
Figure 7B:
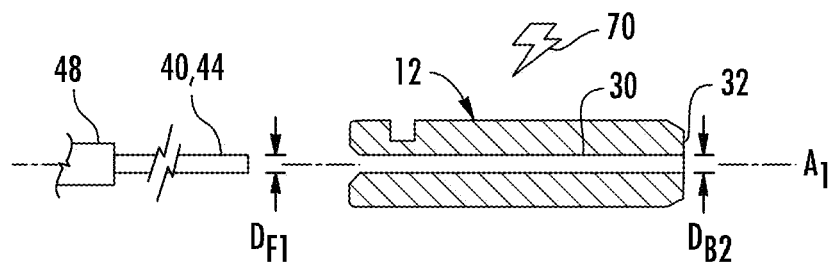
FIG. 7B is a schematic view similar to FIG. 7A, but further illustrating the ferrule being heated as part of a method according to the present disclosure to cause thermal expansion.
Figure 7C:
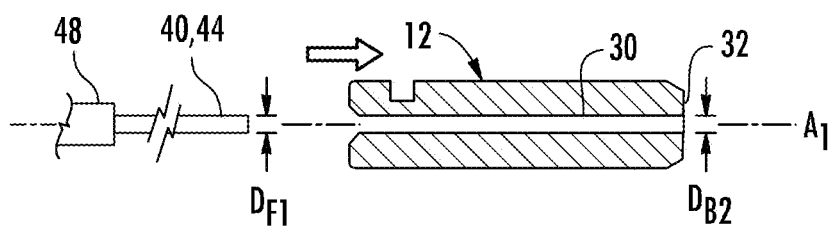
FIG. 7C is a schematic view similar to FIGS. 7A and 7B, but further illustrating the optical fiber being inserted into the ferrule.
Figure 7D:
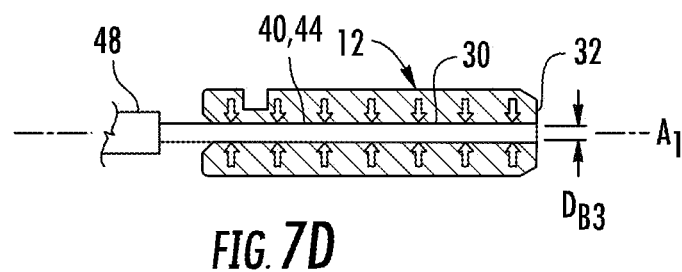
FIG. 7D is a schematic view similar to FIGS. 7A-7C, but further illustrating the ferrule forming a mechanical interface with the optical fiber after the optical fiber has been inserted into the ferrule.

To this end, as generally shown in FIGS. 7A-7D, one method of securing the optical fiber 40 to the ferrule 12 first involves providing the ferrule 12 and the optical fiber 40. Initially the ferrule bore 30 may have a minimum bore diameter $D_{B1}$ ("minimum bore width") that is less than a maximum diameter $D_{OF}$ ("maximum fiber width") of the end portion 44 of the optical fiber 40. Prior to inserting the end portion 44 of the optical fiber 40 into the ferrule bore 30, the ferrule 12 is heated by an energy source 70. The ferrule 12 experiences thermal expansion when heated such that the ferrule bore 30 increases in diameter. Once the temperature of the ferrule 12 reaches a threshold temperature, the ferrule bore 30 increases to a minimum bore diameter $D_{B2}$ that is greater than the maximum diameter $D_{OF}$ of the end portion 44 of the optical fiber 40. As shown in FIG. 7C, the end portion 44 of the optical fiber 40 may then be moved toward the second end 16 of the ferrule 12 and inserted into the ferrule bore 30. Insertion continues until the end portion 44 reaches or extends beyond the front end face 32 of the ferrule 32. At this point, the ferrule 12 is cooled so that the ferrule bore 30 decreases in diameter. Eventually the ferrule bore 30 decreases to a minimum bore diameter $D_{B3}$ (FIG. 7D) as the inner surface of the ferrule bore 30 constricts around the outer surface of the end portion 44 of the optical fiber 40. The minimum bore diameter $D_{B3}$ may be less than a maximum diameter $D_{F1}$ of the optical fiber 40 so that a force $F_1$ is applied by the ferrule 12 to the optical fiber 40, thereby establishing a mechanical interface. In some embodiments, the minimum bore diameter $D_{B3}$ may be greater than the minimum bore diameter $D_{B3}$ but less than the minimum bore diameter $D_{B2}$.

Now referring to specific aspects of the above-described method, the optical fiber 40 and ferrule 12 are initially provided at a temperature below the threshold temperature. The threshold temperature may be set above a normally expected temperature operating range of the fiber optic connector 10. In some embodiments, for example, the threshold temperature may be 100° C. The dimensions and material properties of the optical fiber 40 are such that the minimum bore diameter $D_{B1}$ of the ferrule bore 30 is less than the maximum diameter $D_{F1}$ of the end portion 44 of the optical fiber 40, as mentioned above, when the ferrule 12 is below the threshold temperature.

Figure 8:
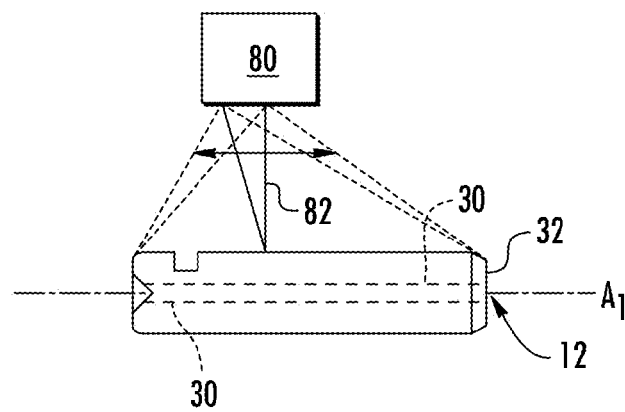
FIG. 8 is a schematic view of a ferrule being heated with a laser to cause thermal expansion.

In terms of heating the ferrule 12 to increase the minimum bore diameter $D_{B1}$, the energy source 70 is shown generically in FIG. 7B because different embodiments may employ different sources/techniques to cause thermal expansion of the ferrule 12. In some embodiments, the energy source 70 may comprise at least one laser. FIG. 8, for example, illustrates an embodiment where a laser 80 is used to irradiate the ferrule 12 with laser energy to cause thermal expansion. The laser energy is delivered by a laser beam 82 emitted from the laser 80. Uniform or bulk heating of the ferrule 12 may be desired in some embodiments and provided by selecting an appropriate combination of optical delivery properties of the laser 80, such as wavelength, power or fluence, duty cycle of pulses, beam shape, beam focus, etc., as well as how the laser 80 is oriented (i.e., angled), positioned, and/or moved relative to the ferrule 12 (or vice-versa). One specific example of a suitable laser is a carbon dioxide laser that operates at one or more wavelengths in the range of 0.1 microns to 11 microns. Other types of lasers are also possibilities.

Figure 9:
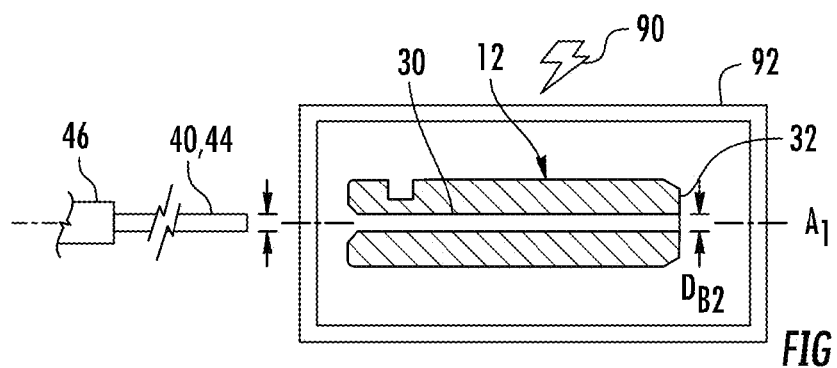
FIG. 9 is a schematic view of a ferrule being heated in an oven to cause thermal expansion.

In alternative embodiments, and as shown in FIG. 9, the energy source may comprise an electrical heating source 90 of an oven 92 into which the ferrule 12 is inserted. Once heated and thermally expanded, the ferrule 12 is removed from the oven 92.

Figure 10:
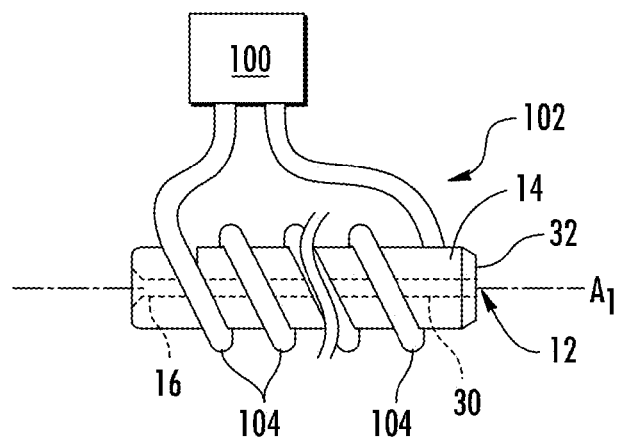
FIG. 10 is a schematic view of a ferrule being induction heated by an electromagnet to cause thermal expansion.

Another alternative is shown in FIG. 10, which illustrates the energy source in the form of an electrical current source 100. An electromagnet 102 is coupled to the electrical current source 100 and includes one or more coils 104 disposed around the ferrule 12. When the electrical current source 100 provides an alternating current to the electromagnet 102, the coils 104 inductively heat the ferrule 12. More specifically, the ferrule 12 may comprise zirconia, or other materials, that provide some electrical resistance to eddy currents induced by the electromagnet 102. The electrical resistance results in heat being generated in the ferrule 12.

In some embodiments, the optical fiber 40 may be heated in addition to the ferrule 12. This may reduce the risk of thermal shock to the ferrule 12 or optical fiber 40 when the two components are later placed in contact. A common energy source (e.g., the laser 80 of FIG. 8 or the electrical heating source 90 and oven 92 of FIG. 9) may be used to heat the optical fiber 40 and ferrule 12. In such embodiments, however, the materials of the optical fiber 40 and ferrule 12 are selected so that a coefficient of thermal expansion of the ferrule 12 is greater than a coefficient of thermal expansion of the optical fiber 40. This allows the minimum bore diameter $D_{B1}$ of the ferrule bore 30 to increase in size faster than the maximum fiber diameter $D_{F1}$ under the same heating conditions. The ferrule 12 may even have a coefficient of thermal expansion at least 15 times greater than the optical fiber 40 in some embodiments.

Cooling the ferrule 12 to form the mechanical interface with the optical fiber 40 may be achieved passively or actively. Accordingly, in some embodiments, cooling may simply be a matter of turning off or removing the energy source 70 (FIG. 7B) so that the ferrule 12 is no longer heated. The ferrule 12 may then be allowed to return to a temperature below the threshold temperature. No powered devices (e.g., fans, pumps, etc.) are used to promote the heat transfer. In other embodiments not shown herein, powered devices may be used to provide active cooling. Regardless, and as mentioned above, when the ferrule 12 cools back below the threshold temperature, the ferrule bore 30 decreases to the minimum bore diameter $D_{B3}$ so as to be less than the maximum diameter $D_{F1}$ of the end portion 44 of the optical fiber 40. Cooling the ferrule 12 a number of degrees (e.g., at least 5°, 10°, 15°) below the threshold temperature helps ensure that the inner surface of the ferrule bore 30 forms the mechanical interface with the entire outer surface of the end portion 44 of the optical fiber 40 that is located within the ferrule bore 30. For example, if the threshold temperature is 100° C., the ferrule 12 (and optical fiber 40, if heated as well) may be cooled to a temperature less than or equal to 95° C.

The mechanical interface formed between the ferrule 12 and optical fiber 40 facilitates one or more additional processing steps that fuse the optical fiber 40 to the ferrule 12. Fusing involves merging/melting/welding the optical fiber 40 and ferrule 12 together and may be accomplished by using one or more lasers to irradiate the optical fiber 40 and ferrule 12 with laser energy. In general, the materials of the optical fiber and ferrule are irradiated with sufficient energy to transform into liquid states so that the materials can blend together and later solidify to form a single entity. By providing the mechanical interface between the optical fiber and ferrule prior to fusing, gaps between the optical fiber and ferrule are reduced or eliminated where the fusing is desired. As a result, the need for molten material to flow from nearby regions of the optical fiber and/or ferrule to fill gaps during fusing is reduced or eliminated. This has the advantage of helping preserve the geometries and spatial relationships that are important for establishing effective optical couplings with mating components.

The laser(s) used for fusing may be the same laser(s) used to heat and thermally expand the ferrule 12 in some embodiments (e.g., the embodiment of FIG. 8). Even further, the same laser(s) may also be used to form an optical surface on the end portion 44 of the optical fiber 40 at a protrusion height $H_1$ (FIG. 1) within 50, 15, or even 10 microns of the front end face 32 of the ferrule 12. The laser(s) may even be used to form such an optical surface flush with the front end face 32. As can be appreciated, however, at least one optical delivery property of the laser(s) may be changed for the different processing steps to provide the different result (i.e., fusing instead of heating/thermally expanding, and forming an optical surface instead of fusing). Exemplary optical delivery properties include, without limitation: wavelength, power or fluence, duty cycle of pulses, beam shape, and beam focus. How the laser(s) is/are oriented, positioned, and/or moved relative to the ferrule 12 (or vice-versa) may also be changed. One specific example of a suitable laser for fusing is a carbon dioxide laser that operates at one or more wavelengths in the range of 3 microns to 11 microns. Other types of lasers are also possible.

Figure 11:
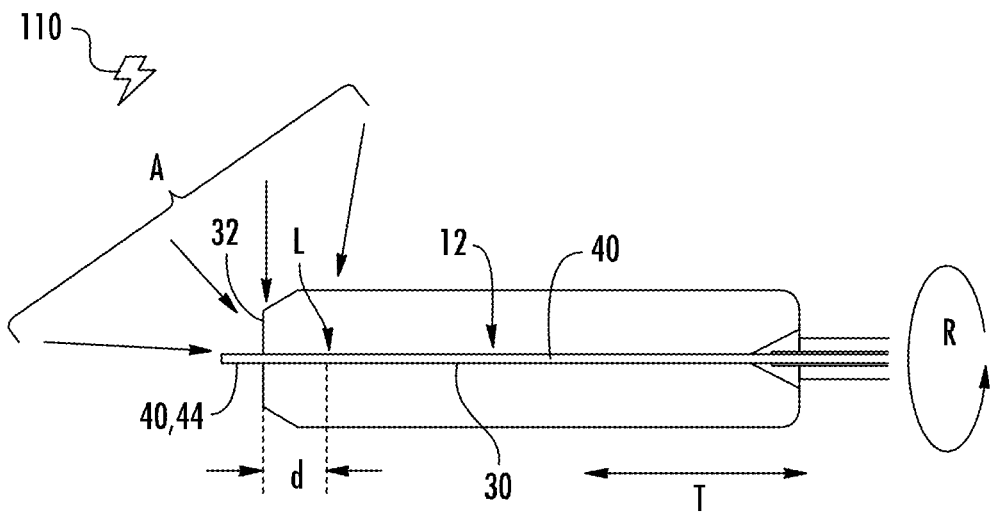
FIG. 11 is a schematic side view of a ferrule being irradiated with laser energy according to a method of the present disclosure to fuse an optical fiber to the ferrule.

With this in mind, FIG. 11 illustrates one example of how the optical fiber 40 may be fused to the ferrule 12. The notch 26 (FIGS. 1 and 2) in the ferrule 12 is not shown to simplify matters. Indeed, the notch 26 may not even be present in some embodiments. As schematically shown in FIG. 11, a laser 110 may deliver laser energy toward the ferrule 12 in any of various directions, as represented by the arrows A in FIG. 11, including from nearly parallel to the optical fiber 40 to perpendicular to the optical fiber 40, or even beyond perpendicular to the optical fiber 40. The ferrule 12 and optical fiber 40 may also be rotated in the direction R and translated in the direction T as shown, so as to fuse end portion 44 of the optical fiber 40 to the ferrule 12 along at least 10%, 25%, or 50% of the length of the ferrule bore 30. In some embodiments, the optical fiber 40 may even be fused to the ferrule 12 along the entire length of the ferrule bore 30. In other embodiments, the optical fiber 40 may only be fused to the ferrule 12 a locations L within the ferrule bore 30 that are at least a distance d from the front end face 32. For example the optical fiber 40 may only be fused to the ferrule 12 at locations L at least 1 mm (or 2 mm, 5 mm, etc.) deep inside the ferrule bore 30 such that the distance d is at least 1 mm (or 2 mm, 5 mm, etc.). The laser 100 may be moved relative to the optical fiber 40 and ferrule 12, rather than moving the optical fiber 40 and ferrule 12 relative to the laser 100, to provide either or both the rotation in the direction R and the translation in the direction T.

Figure 12:
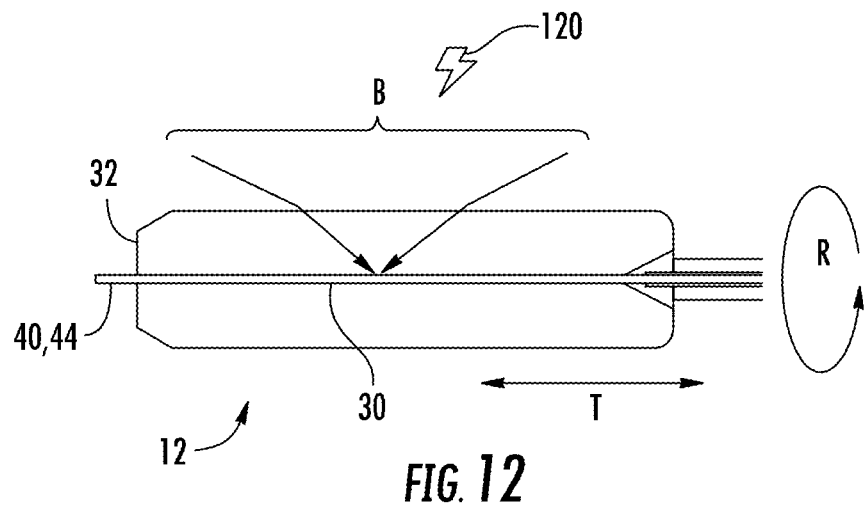
FIGS. 12 and 13 are schematic side and front views of a ferrule being irradiated with laser energy according to another method of the present disclosure to fuse an optical fiber to the ferrule.
Figure 13:
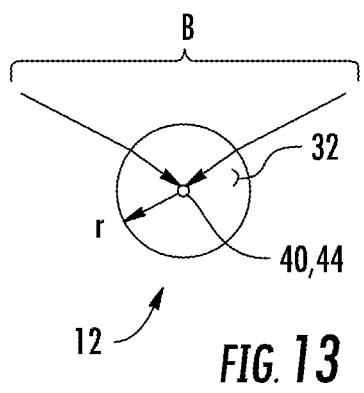

FIGS. 12 and 13 schematically illustrate another example of how a laser 120 may be used to fuse the optical fiber 40 to the ferrule 12. As shown in FIGS. 12 and 13, the laser 120 may emit a laser beam B (only the outermost rays are represented) that has been focused with a short focal length lens so to a have an extreme convergence angle. The laser beam B is largely transmissive through the ferrule 12, but develops enough intensity or energy density at the center of the ferrule 12 to fuse the end portion 44 of the optical fiber 40 to the ferrule 12. Both relative axial rotation R and relative translation T may be used to perform a rapid helical sweep of the ferrule 12 with the laser beam B. Such a sweeping technique may facilitate fusing across the entire mechanical interface formed between the optical fiber 40 and ferrule 12, particularly when the ferrule 12 as a whole comprises largely (i.e., greater than 75%), substantially (i.e., greater than 95%), or entirely (i.e., 100%) fused silica, borosilicate, glass ceramic, or the like. Ferrules comprised in this manner are considered to be "non-composite ferrules" according to this disclosure.

On the other hand, processes or methods where a laser beam approaches the front end face 32 of the ferrule 12 to irradiate the ferrule 12 with laser energy may be more suited for embodiments where the ferrule 12 comprises an inorganic composite material having a material gradient (a "composite ferrule" according to this disclosure). The composite material may, for example, have a material gradient from at least 75% (or even further, at least 90% or 100%) by volume of a first inorganic material to at least 75% (or even further, at least 90% or 100%) by volume of a second inorganic material in a radially inward direction of the ferrule (i.e., radially inward relative to the optical axis $A_1$). In some embodiments, the first inorganic material may comprise or consist of a ceramic, such as alumina and/or zirconia, while the second inorganic material may comprise or consist of a glass or glass material, such as silica. Alternatively or additionally, the first inorganic material may have a fracture toughness of at least 1 MPa·m½ (or even further, at least 1.5 MPa·m½), and the second inorganic material may have a softening point less than 1000° C. (or even further, less than 900° C.).

Figure 14:
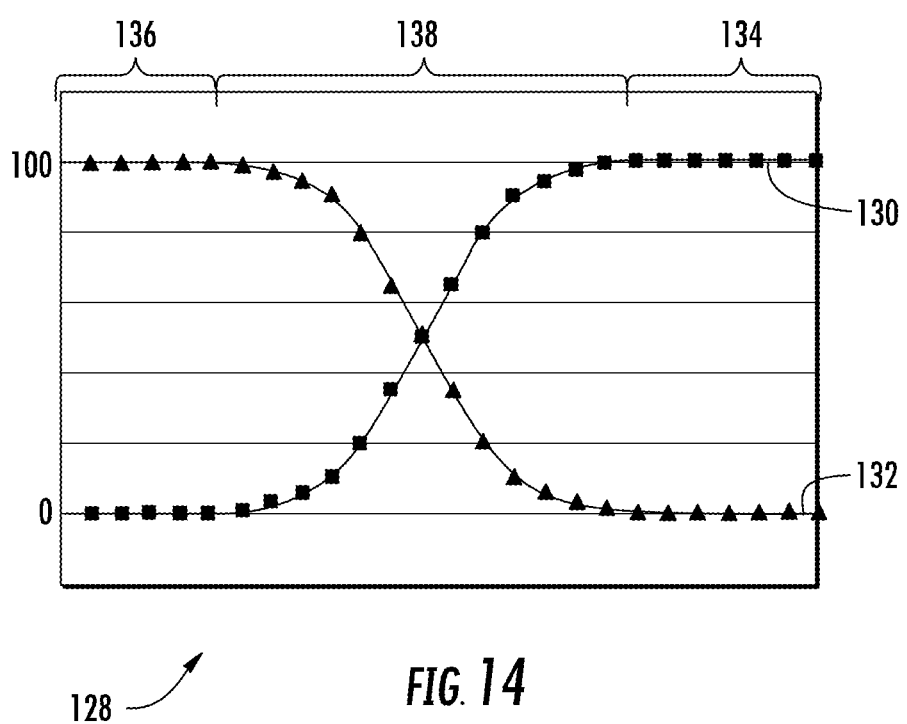
FIG. 14 is a graph of an exemplary material gradient profile for a ferrule used in methods according to the present disclosure.

To illustrate these aspects in further detail, FIG. 14 is a plot that shows an example of a material gradient 128 for the ferrule 12. The vertical axis represents the percentage by volume of the respective phase or material component of the ferrule 12, with trace 130 representing the percentage of the first inorganic material and trace 132 representing the percentage of the second inorganic material. The horizontal axis represents the distance along a radius of the ferrule 12, measured from the center of the ferrule at radius 0 (i.e., the optical axis $A_1$ in the embodiments discussed above) to an outer radius r (FIG. 13). As shown in FIG. 14, there are different regions of the plot that correspond to different regions of ferrule 12. In a first region 134, which corresponds to an outer region of the ferrule 12, the material of the ferrule 12 is 100% the first inorganic material. In a second region 136, which corresponds to an inner region of the ferrule 12 (i.e., proximate the ferrule bore 30), the material of the ferrule 12 is 100% the second inorganic material. A third, intermediate region 138 includes the material gradient, where the percentages of the first inorganic material and second inorganic material transition smoothly between their respective values in the first and second regions 134, 136. Again, FIG. 14 is merely an example, as the material gradient may be between different percentages of the first and second inorganic materials in other embodiments; between something other than 100% such that the innermost and outermost regions of the ferrule 12 comprise composite materials.

The length of the first, second, and third regions 134, 136, 138 may also vary in different embodiments. The third region 138 with the material gradient may, for example, extend along at least 1/10 (or at least 1/3, 1/2, etc.) of the length of the radius of the ferrule 12. The plot in FIG. 12 shows the third region 138 extending along about 1/2 or more of the length of the horizontal axis, which corresponds to about 1/2 or more of the length of the radius r. Providing the gradual transition from the first inorganic material to the second inorganic material over such a large region of the ferrule 12 helps spread any stresses that may arise between the first and second inorganic materials over the operating temperature range of the ferrule 12. In other words, rather than being concentrated in localized areas, such as at an interface between two distinct layers of material, stresses may be spread across the third region 138. This advantage also applies to embodiments where the third region 138 only extends along 1/10 or more of the length of the radius r (rather than 1/2 or more), although possibly to a lesser extent.

In other contemplated embodiments, layers of composite material having differing ratios of the first and second inorganic materials may provide a stepped transition from an exterior of the ferrule 12 to the ferrule bore 30. For each successive layer from the exterior toward the ferrule bore 30, the percentage of the second inorganic material may increase while the percentage of the first material may decrease in a corresponding manner. Accordingly, the outermost layer corresponds to the outer region of the ferrule 12 and has a ratio according to the percentages above (100%, 90%, 75%, etc., depending on the embodiment). The innermost layer corresponds to the center of the ferrule, or more specifically the inner surface of the ferrule bore 30, and has a ratio according to the percentages above (100%, 90%, 75%, etc., depending on the embodiment). Any number of discrete layers may be provided between the outermost and innermost layers, bringing the total number of discrete layers to three or more. Providing three or more discrete layers, and especially five or more discrete layers, helps ensure that the degree of change in coefficient of thermal expansion at the interface/transition between adjoining layers does not result stresses great enough crack the ferrule 12 or delaminate the layers as the optical fiber 40 is fused to the ferrule 12.

Figure 15:
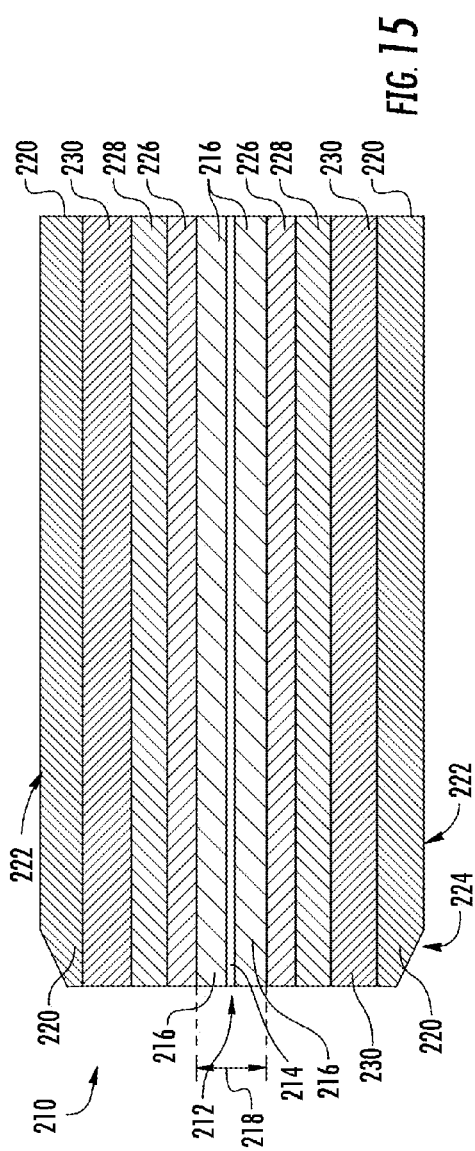
FIG. 15 is a schematic diagram of ferrule in cross-section according to another embodiment of this disclosure.

Other ferrule constructions may be provided to facilitate fusing the optical fiber 40 to the ferrule 12. For example, FIG. 15 illustrates a ferrule 210 that includes an interior 216 defining a bore 212 configured to receive a waveguide, such as an optical fiber 214. The ferrule 210 is graded or layered. The interior 216 of the graded or layered ferrule 210 includes a low-expansion material, such as a material having a coefficient of thermal expansion that is less than $40 \times 10-7/°$ C., preferably less than $30 \times 10-7/°$ C. In some embodiments, the interior 216 includes a boro-silicate or silica glass, preferably a silica glass. The interior 216 may have an outer diameter 218 that is greater than 200 microns, but in some embodiments, is less than 2.3 mm in diameter. For example, the interior 216 may have a diameter between 300 microns and 1 mm in some embodiments, or even between 300 microns and 600 microns in some embodiments.

The ferrule 210 further includes an outer region 220 and/or layer (e.g., exterior 222 of the ferrule 210) that includes a ceramic plus glass. In some such embodiments, the ceramic includes zirconia, preferably tetragonal zirconia with the ceramic being more than 40 volume percentage of the composition of the exterior 222 of the ferrule 210.

According to an exemplary embodiment, the interior 216 of the ferrule 210 may be a redrawn glass rod (e.g., silica rod) with an inner-diameter bore 212 (e.g., hole) of about 120-130 microns in cross-sectional diameter. In some embodiments, one end is tapered (not shown) from the outer diameter of the silica rod to the inner hole, which may ease insertion of the optical fiber 214.

As previously mentioned, the ferrule 210 is graded between the interior 216 and exterior 222. In some embodiments, a second layer 226 of the ferrule 210 adjoining the interior 216 of the ferrule 210 may include a layer of low-expansion glass, glass/ceramic, or glass plus ceramic. The second layer 226 has a higher coefficient of thermal expansion than the low-expansion inner core (i.e., interior 216). According to an exemplary embodiment, the ferrule 210 includes a third layer 228 of glass, glass/ceramic, or glass plus ceramic having a coefficient of thermal expansion that is greater than the second layer 226. In some embodiments, the ferrule 210 may further include a fourth layer 230 of higher-expansion glass, glass/ceramic, or glass plus ceramic; and a fifth and outer layer 220 of still higher expansion glass/ceramic or glass plus ceramic.

In some embodiments, a ferrule 210 for optical waveguides includes a glass plus crystalline ceramic, where the thermal expansion coefficient is graded in layers or continuously changes. In some such embodiments, the thermal expansion coefficient changes from less than $7 \times 10-7/°$ C. for material on the interior 216 of the ferrule 210 to greater than $90 \times 10-7/°$ C. for material on the exterior 222 of the ferrule 210. The thermal expansion coefficient for layers 216, 226, 228, 230, 220 of the ferrule 210 may increase in incrementally greater amounts with distance from the interior 216 of the ferrule 210, or the thermal expansion coefficient material may continuously, and smoothly increase with distance from the interior 216. In other embodiments, some intermediate layers or sections may contrast the general trend, temporarily decreasing in coefficient of expansion or staying the same with respect to distance from the interior 216 of the ferrule 210. Such layers or sections, for example, may serve other functions for the ferrule 210, such as to facilitate laser light transmission or provide thermal barriers with respect to heat transfer.

In general, the larger the grading layer or intermediate expansion layer, the less stress there is in the body of the ferrule 210. In some embodiments, the interior 216 of the ferrule 210 is silica, the exterior 222 is at least 40% crystalline zirconia, and an intermediate expansion grading or layer 226 is positioned therebetween. The intermediate expansion 226 grading or layer may be greater than 20 microns thick, such as at least 100 microns. In other such embodiments, the ferrule 210 includes a boro-silicate. In still other embodiments, the glass in the intermediate grading or intermediate layer 216 includes a glass of (in mole %) 59.08 $SiO_2$, 13.33 $B_2O_3$, 9.37 $Al_2O_3$, 8.03 $Na_2O$, 4.09 CaO, 1.28 $Li_2O$, 1.64 $K_2O$, 1.79 MgO, 1.37 $ZrO_2$.

In some embodiments, material of the exterior 222 is greater than 40% crystalline zirconia and also includes a glass of (in mole %) 59.08 $SiO_2$, 13.33 $B_2O_3$, 9.37 $Al_2O_3$, 8.03 Na2O, 4.09 CaO, 1.28 Li2O, 1.64 K2O, 1.79 MgO, 1.37 ZrO2. According to at least one embodiment, the grading or layer 226 of the ferrule 210 is over more than 20 microns in thickness and is located next to the interior low-expansion core (i.e., interior 216) is comprised of 25% or more of a glass or glass-ceramic, such as including at least one the families of Glass B (mole %): 60.0 SiO2, 20.0 Al2O3, 20.0 ZnO and Glass C (mole %): 59.0 SiO2, 19.6 Al2O3, 12.4 ZnO, 6.8 Li2O, 2.2 ZrO2.

In some embodiments, the interior 216 of the ferrule 210 is formed by a low-expansion core that is at least 200 microns in outer diameter 218. In some such embodiments, the core is at least 300 microns in outer diameter 218. In some embodiments, crystalline ceramic material is in the exterior 222 of the ferrule 210. In some of those embodiments, the crystalline ceramic material includes zirconia, preferably zirconia that is mainly tetragonal. The zirconia may be doped with a rare earth oxide, Y, Ca, Mg, In, or Sc oxides and combinations thereof. The zirconia may also contain stabilizing dopant aids of oxides of Ti or Sn and/or toughening agents of oxides of Nb, Ta, W, and Mo. Some embodiments include a layered or graded ferrule 210 where crystalline ceramic of the exterior 222 is zirconia with 3 mole % or less yttria, with the zirconia having less than 2.5 mole % yttria being more preferred.

Although some of the examples below use cold pressing as a shape forming method, there are a great variety of methods that can be used for forming the graded or layered body. One of the most useful of such methods includes pressure-less sintering. To reduce stresses developed by the thermal expansion differences of materials of the ferrule 210, low fabrication (sintering) temperatures may be used. For example, processes where ferrules are sintered at less than 1100° C. are preferred, with less than 1000° C. being more preferred, with 950° C. being even more preferred, with 850° C. being still more preferred.

In some contemplated embodiments, layered or graded structures of a ferrule 210 as disclosed herein may be formed directly form graded or layered powders. When sintering a pure silica core, according to an exemplary embodiment, temperatures over 1400° C. may be used. However, such temperatures may cause de-vitrification issues with some composition combinations used for the intermediate layers 230, 228, 226. As such, it is preferred to sinter the ferrule 210 around a pre-formed low-expansion core rod (e.g., inner layer 216) having a central bore 212 hole. The central core rod may be redrawn with an accurate central bore if the low expansion core is a glass. Silica and boro-silicates are particularly amenable to this re-draw process.

Figure 16:
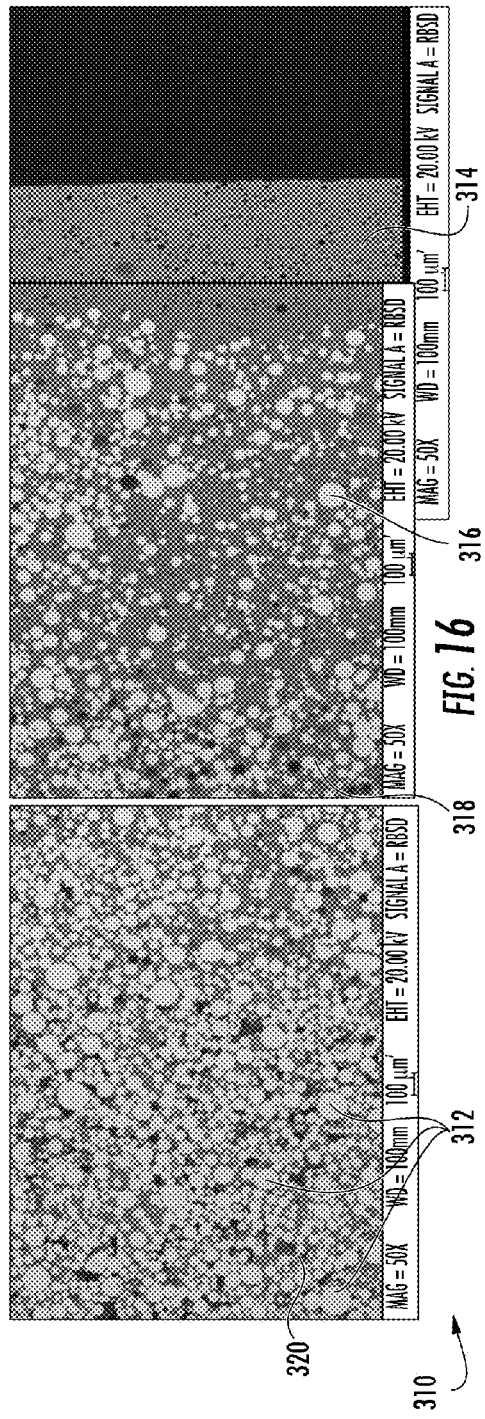
FIG. 16 is a scanning electron microscope (SEM) micrograph of four sintered layers with a composition gradient according to an exemplary embodiment.

For ease of processing, the crystalline ceramic powders can be used in the form of agglomerates (see agglomerates 312 as shown in FIG. 16), such as may be produced via a spray drying process. With some crystalline ceramic compositions, there may be improved performance by pre-sintering the agglomerates, particles, grains etc. (prior to sintering the ferrule 110) to achieve the desired grain size for the properties of interest. For instance, pre-sintering zirconia agglomerates in temperatures between 1250 and 1700° C., preferably between 1300 and 1600 C, may provide near-spherical granules that are nearly pore free, with mostly tetragonal phase zirconia. For example, with such a process, the grains size is large enough to allow some transformation to monoclinic zirconia, allowing the possibility of some transformation toughening.

According to another exemplary embodiment, if a low-expansion core cane (e.g., interior 216) is being made by redraw, layers 226, 228, 230 may be added and/or gradient may be provided using coating cups, drying regions, and/or sintering regions on the end of the draw, in a manner similar to applying a protective polymer coating to optical waveguides. In some such embodiments, there can be a coating cup and drying station for each layer, and if the layer composition can sinter rapidly, there may be two or more coating stations with drying and sintering regions, where the rod or cane is drawn through continuously.

According to an exemplary embodiment, extrusion may be a particularly useful shape forming method for elongate objects, such as those with constant cross-sections. Ram extrusion using a billet of material, where the billet contains the composition gradient or the differing composition layers, may be used to form the complete unfired ferrule body or a graded or layered tube where a core rod of low expansion glass is also used, preferably inserted prior to sintering.

According to some such embodiments, co-extrusion, using more than two feed streams, may be utilized and can give better results than billet/ram extrusion. For example, the entire structure may be co-extruded or several layers can be co-extruded and a dense core rod inserted therein. In some alternate embodiments, tubes of various diameters and compositions can be extruded singly, assembled into layered/graded rods or tubes, perhaps with a pressing operation after assembly to insure knitted interfaces.

According to other embodiments, cold-pressing, uniaxial, dry bag quasi-iso-static, wet bag iso-static methods may be used for forming the ferrule 210. For a dry wet bag or even a uniaxial pressing operation, there may be a series of concentric funnels that can fill the bag or die simultaneously, and then only one pressing operation for the ferrule 210. As shown in the examples below, powders may be pressed and sintered around a dense core rod. Repeated pressing operations are contemplated, with a new composition being built up around the interior body to create layers and gradients. Such pressing operations may be done around a dense core rod, but need not be limited to concentric cylinders of differing compositions and/or thermal expansion coefficients. Assembly of a graded or layered tube around a glass core may be done via a second pressing operation to increase contact between the core and the powder tube. With some such methods too, tubes of various diameters and compositions can be pressed singly, assembled into layered/graded rods or tubes, perhaps with a pressing operation after assembly to insure knitted interfaces.

In some contemplated embodiments, the graded or layered ferrule 210 has a significant amount of glass in some or all areas of the ferrule 210, and does not include a separate central core of glass. Further, the viscosity/composition of the glass may be adjusted (via material selection) to give similar viscosities for the various glass, glass-ceramic, glass plus ceramic layers or gradient, and then a large graded or layered blank may be built before re-drawing all or part of the ferrule structure. Redrawing a tube may require careful control of the pressure or vacuum in the central bore hole during the re-draw process.

In other contemplated embodiments, electrostatic methods may be used for providing graded or layered rod shapes. For example, dry or wet powder can be electrically charged, strong thin gatherer wire filament may be oppositely charged, or a core cane/rod can be coated to make the core cane/rod slightly conductive, and a layered or graded ferrule pre-form can be made. Hollow graded or layered tubes can be made and assembled around an interior glass core. The core rod can be drawn continuously through different powder chambers or different powders may be introduced to a single chamber. For example, metallic pre-forms with a plethora of rod "gatherer" shapes can be used.

In some contemplated embodiments, slip casting methods can be used for graded or layered rod shapes. Powder can be dispersed in a fluid usually via surfactants and suitable salt, acid, base adjustment to the carrier fluid, and the powder deposited in a porous mold. The layered or graded ferrule pre form can be made by sequential removal then additions of fluids with differing powder compositions. A fluid can be delivered to the mold via a tube and the composition of the fluid and powder in the tube varied with time. Hollow graded or layered tubes can be made and assembled around an interior glass core. Pressure slip casting can also be practiced.

In still other contemplated embodiments, electrophoretic methods may be used to provide graded or layered rod shapes. For example, powder can be electrically charged, usually via surfactants and suitable salt, acid, base adjustment to the carrier fluid. The powder may then be deposited on a strong thin gatherer wire filament oppositely charged, or a core cane/rod coated to make the core cane/rod at least slightly conductive, and the layered or graded ferrule pre-form can be made. Hollow graded or layered tubes can be made and assembled around an interior glass core. The core rod can be drawn continuously through different fluid chambers or different powders/fluids may be introduced to a single chamber. Metallic pre-forms with a plethora of rod "gatherer" shapes can be used.

Single-composition ferrules are typically made by injection molding, sintering, and machining. Some embodiments may involve injection molding a core powder, then sequentially taking the part and putting the part into larger and larger dies, and thereby injection molding more layers around the original core. To maintain the sample of the first core (e.g., interior 216) and layers 226, 228, 230, each succeeding layer may need a lower temperature carrier polymer.

For at least some of the layers, such as the outer crystalline ceramic containing layers 220 or layers forming the gradient, layers or regions with a porosity or a porosity and composition gradient/layers can be arranged as a pre-form and then infiltrated with glass. The infiltration can be driven via capillary forces, or an external pressure can be used. Additionally, the ferrule pre-form may be covered with a gas impermeable glass, and hot iso-static presses may be used.

According to an exemplary embodiment, a combined technique of pull-trusion with either a billet or multiple feed die can be utilized. With a strong core rod, the rod may be mounted on a reel, the real put into a pressure vessel, and the interior rod fed into a billet or multi-feed die and/or extrusion feed pressure chamber, with a seal between the reel pressure chamber and the extrusion feed chamber. With pressures in the two chambers balanced, the core rod may be pulled through an extrusion die while the layered or graded ferrule powder is extruded onto it. A gas or hydraulic pressure can be fed into the reel pressure chamber to prevent hydraulic pressure to prevent extrusion batch back flow.

Another extrusion method includes use a carousel form to hold a core cane or inner core region, and a tube of one layer extruded onto the inner core or rod. Upon heating and/or drying, the outside tube and/or layer will shrink. Part or even the entire carousel may be moved to a second extruder where another, larger layer can be extruded over the previous material. This sequence may be repeated until the final gradation and/or number of layers is finished.

According to another exemplary embodiment, a layered and gradient composition for ferrules 210 may be made by a repeated-dipping method (conceptually similar to 17th century candle making processes). For example, using a thin "bait" fiber or a core rod, and repeatedly dipping the same into a molten slurry of powder and polymer, the layers or gradient is constructed. To maintain the sample of the first core and layers, each succeeding layer may have a lower temperature carrier polymer.

The following examples are provided for context. In some cases, examples below have porosity in layers 226, 228, 230 of the ferrule 210 materials. For strength reasons, and for mechanical reliability and wear concerns, the exterior surface 222 and/or region 220 of the ferrule 210 has the fewest (i.e., a minimum of) large pores relative to the rest of the ferrule 210, which can be controlled through use of binders and plasticizers to achieve better powder packing in some of the above-disclosed processes and to achieve better grading of the size distribution of the powders, and through use of bi- and tri-modal powders, where the smaller powders "fit" into the interstices of the larger powders. Further, porosity can be reduced by hot iso-static pressing. The hot isostatic pressing may work particularly well when the temperature of the pressing is near that of the sintering, such as within 200° C. When the ferrule 210 is sintered to a closed porosity, the ferrule material itself may support the pressure to remove the porosity. The sintering and pressing can be done in a single thermal cycle with a hot iso-pressing furnace. If there is open porosity in the ferrule 210, then the surface should be made gas impermeable to densify the ferrule 210, which can be accomplished by providing a dense outer coating of glass or metal. For example, in the 700 to 1300° C. range, some ferrous metals are applicable and can be acquired in thin sheets. Numerous ferrules or a long length of numerous ferrules can be spaced on a sheet of material (perhaps with depression for the ferrules), with a second sheet layered on top and sealed, with the air being evacuated. The ferrules or multi ferrule rods can then be hot iso-statically pressed. Pressures at or below 30 kpsi are preferred and cycle times of less than 12 hours are preferred.

EXAMPLES

Three different zirconia composition were used and three different glass, glass-ceramic compositions where used. The zirconia was purchased from Tosoh Chemical Company, Japan and were TZ 0Y, zirconia without any dopant; TZ2Y, zirconia-2 mole % yttria; and TZ3Y, zirconia with 3 mole % yttria. A medium thermal-expansion (e.g., about $70 \times 10^{-7} \pm 20 \times 10^{-7}/°$ C. expansion coefficient), low-temperature sintering glass, glass A (mole %): 59.08 $SiO_2$, 13.33 $B_2O_3$, 9.37 $Al_2O_3$, 8.03 $Na_2O$, 4.09 CaO, 1.28 $Li_2O$, 1.64 $K_2O$, 1.79 MgO, 1.37 $ZrO_2$ and two low-expansion, glass-ceramics (e.g., having an approximately 0 to $10 \times 10^{-7}/°$ C. expansion coefficient), Glass B (mole %): 60.0 $SiO_2$, 20.0 $Al_2O_3$, 20.0 ZnO and Glass C (mole %): 59.0 $SiO_2$, 19.6 $Al_2O_3$, 12.4 ZnO, 6.8 $Li_2O$, 2.2 $ZrO_2$ were used. Silica "rods" of about 350-400 microns in diameter and $5.5 \times 10^{-7}/°$ C. expansion coefficient were also used. The silica "rods" were made by re-drawing a silica boule and can be made with an accurate inner diameter (bore) of about 126 micron.

As a guide for experimentation a simple semi-analytic stress model was developed for two- to five-layer structures of infinite-length, cylindrical, elastic structures with the outer layer being about 2.5 mm in outer diameter, as shown in FIGS. 18-21. The model focused on the circumferential (tensile) stress component and allowed for different thermal expansion coefficients, Young's elastic moduli, Poisson's ratios, and layer numbers and thicknesses. All the layers were assumed to be hollow cylinders, except for the inner layer which was a solid cylinder, and all the cylinders were concentric.

Referring once more to FIG. 15, a five-layer ferrule 210 includes a silica interior 216, a layer of a low-expansion glass (e.g., silica core; lower thermal expansion coefficient than the other layers); a layer of glass-ceramic 226 next to the silica core 216; an intermediate thermal expansion coefficient layer of glass 228, a higher thermal expansion glass plus zirconia layer 230, and a higher-still expansion layer 220 of glass plus zirconia. According to an exemplary embodiment, the ferrule 210 includes more than two layers, where each of the layers is formed from a material having a higher coefficient of thermal expansion than the adjacent interior layer, and where the material of the innermost layer 216 has the lowest coefficient of thermal expansion.

Example 1

Glass A was melted then ground and milled into powder, with the median powder particle size being between 3 to 7 microns; where Glass A is a low-temperature sintering glass, including (mole %): 59.08 $SiO_2$, 13.33 $B_2O_3$, 9.37 $Al_2O_3$, 8.03 $Na_2O$, 4.09 CaO, 1.28 $Li_2O$, 1.64 $K_2O$, 1.79 MgO, 1.37 $ZrO_2$. Agglomerates of zirconia-3 mole % yttria where pre-sintered at 1300° C. in air for 2 hours. Mixed compositions of zirconia-3 mole % yttria pre-sintered agglomerates were mixed with 50 volume %, 62.5 volume %, and 75 volume % Glass A.

Thin layers of 100% Glass A, 75% Glass A, 62.5% Glass A, and 50% Glass A were spread in a steel bar die and uni-axially pressed. The bar pre-form was placed in a latex iso-pressing bag, the air was removed by a vacuum pump and the bag was sealed. The bar was cold iso-statically pressed to about 25 kpsi. The pressed bar was placed on coarse alumina "setter" sand in an alumina sagger box and sintered at 900° C. in air for 4 hours.

The bar was cut, polished, and examined by scanning electron microscope SEM. FIG. 16 shows the cross-section structure, with the bar intact. More specifically, FIG. 16 shows a SEM micrograph of four sintered layers 314, 316, 318, 320.

Example 2

Glass-ceramic B was melted then ground and milled into powder, with the median powder particle size being between 3 to 7 microns; where Glass B includes (mole %): 60.0 $SiO_2$, 20.0 $Al_2O_3$, 20.0 ZnO. Agglomerates 212 of zirconia-3 mole % yttria where pre sintered at 1550° C. in air for 2 hours. Mixed compositions of zirconia-3 mole % yttria pre sintered agglomerates 312 were mixed with 50 volume % and 75 volume % Glass A. Further, Glass A and glass-ceramic B (i.e., Glass B) were mixed in a 50-50% ratio.

Thin layers of the mixture of 50% Glass A and 50% glass-ceramic B, 100% Glass A, 75% Glass A and 25% zirconia 3 mole % yttria, and 50% glass (e.g., Glass A) plus 50% zirconia-3 mole % yttria were spread in a steel bar die and uni-axially pressed. The bar pre-form was placed in a latex iso-pressing bag, air was removed by a vacuum pump, and the bag was sealed. The bar was cold iso-statically pressed to about 25 kpsi.

The pressed bars were placed on coarse alumina "setter" sand in an alumina sagger box and sintered at 800° C. or 900° C. in air for 4 hours. The bars were intact and graded from a low-expansion glass ceramic of between about $3\times10^{-6}$ to $4\times10^{-6}/°$ C. to a high-expansion glass plus ceramic of about $9.5\times10^{-6}/°$ C., where the bars across this gradient were intact.

Example 3

Glass A and glass-ceramic B where mixed in a 50-50% ratio. A layer of the mixture of 50% glass A and 50% glass-ceramic B was spread in a steel bar die, a cleaned silica "rod" of between about 350-400 microns in diameter was placed in the die and a second layer of powder was placed on top and uni-axially pressed. The bar pre-form was placed in a latex iso-pressing bag, the air was removed by a vacuum pump, and the bag was sealed. The bar was cold iso-statically pressed to about 25 kpsi. The pressed bar was placed on coarse alumina "setter" sand in an alumina sagger box and sintered at about 800° C. or 900° C. in air for 4 hours. The bars were intact cross-sectioned and polished and examined by SEM.

Figure 17:
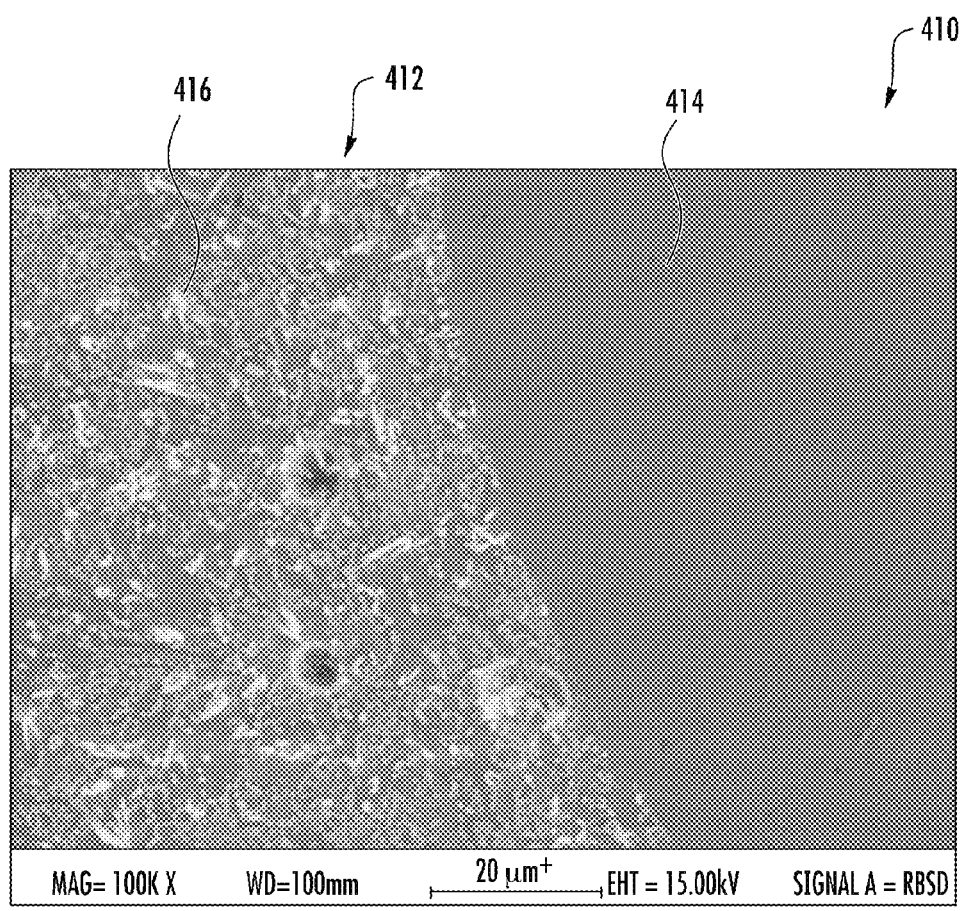
FIG. 17 is an SEM micrograph of a silica rod in a material including 50% glass and 50% glass-ceramic according to an exemplary embodiment.

FIG. 17 shows the interface 412 of structure 410 between the silica 414 and the sintered Glass A plus glass-ceramic B 316. No de-vitrification was found at the silica interface 412 and no fracture was found in the matrix sintered glass. The bonding is very good. X-ray diffraction showed a pattern of the 50-50% Glass A and glass-ceramic B fired at 900° C. 2 hr. air, having several different crystalline phases, Virgilite, Gahnite, Willemite and Albite and glassy halos.

Example 4

Figure 18:
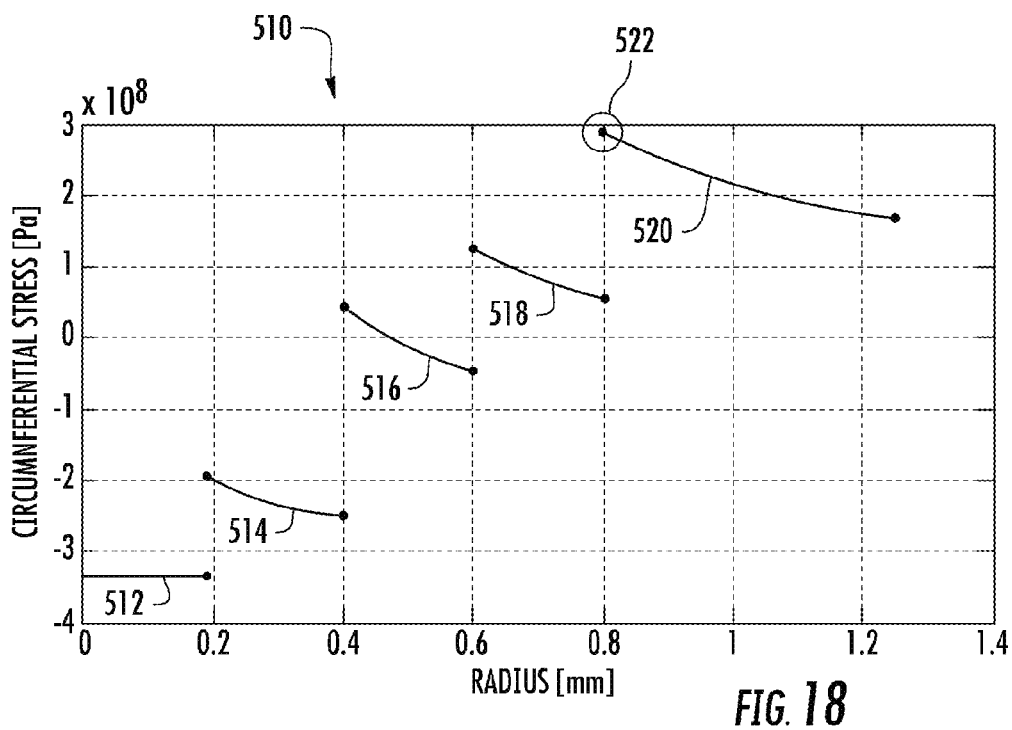
FIGS. 18 and 19 are plots of estimated macro-stresses in five-layer ferrules according to exemplary embodiments.
Figure 19:
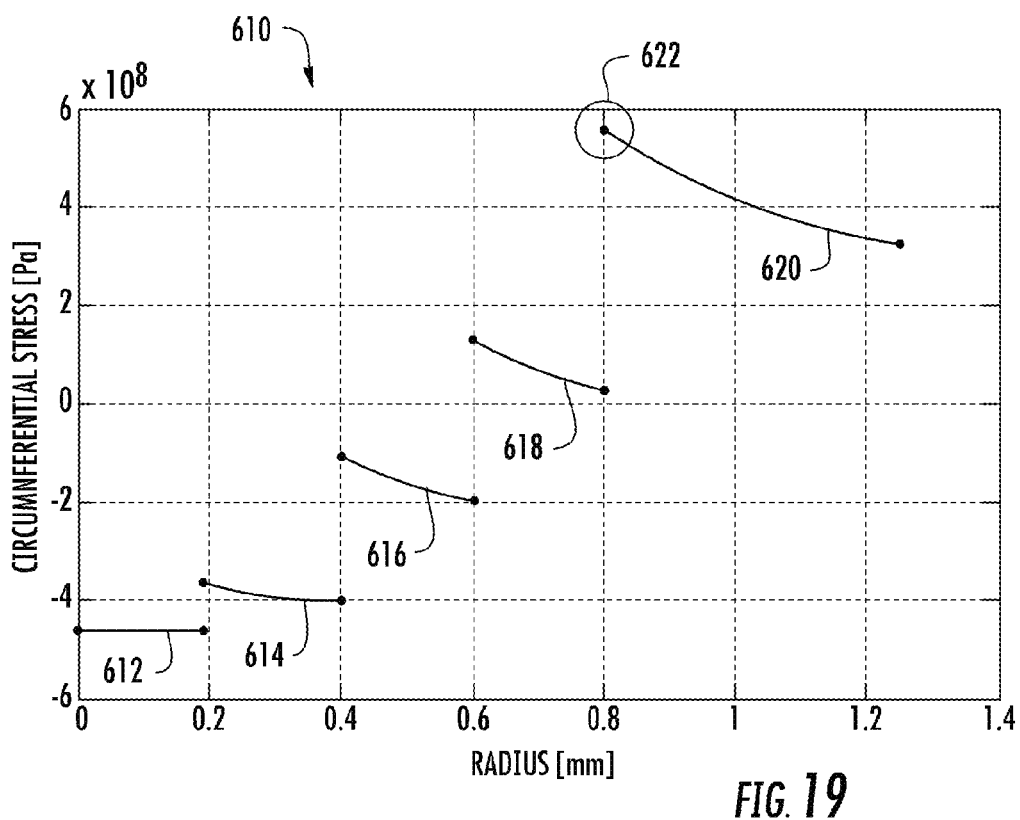

Referring to FIGS. 18 and 19, using the semi-analytic stress model, circumferential stresses in five-layer ferrules were calculated. Table I below shows values used in the stress model. Other than for the silica interior, the Poisson's ratio was estimated to be 0.3, and Young's elastic modulus and thermal expansion coefficient were treated as simple linear interpolations between the end members. Layer 1 (412) is silica, layer 2 (414) is a 50-50% mix of Glass A and glass-ceramic B, layer 3 (416) is 100% Glass A, layer 4 (418) is 25 volume % zirconia-3 mole % yttria plus 75 volume % Glass A, and layer 5 (420) is 50 volume % zirconia-3 mole % yttria plus 50 volume % Glass A.

TABLE I

| Layer # | Young's elastic modulus GPa | Poisson's ratio | Thermal expansion /° C. | Layer outer radii mm |
| --- | --- | --- | --- | --- |
| 1 | 72.9 | 0.14 | $5.5 \times 10^{-7}$ | 0.19 |
| 2 | 73 | 0.3 | $3.5 \times 10^{-6}$ | 0.4 |
| 3 | 73 | 0.3 | $7 \times 10^{-6}$ | 0.6 |
| 4 | 107 | 0.3 | $8.25 \times 10^{-6}$ | 0.8 |
| 5 | 140 | 0.3 | $9.5 \times 10^{-6}$ | 1.25 |

FIG. 18 shows the approximate circumferential stress distribution 510 through the layers 512, 514, 516, 518, 520, assuming the five-layer body was sintered at 800° C. and cooled to 0° C., with no stress relaxation. As can be seen from FIG. 18, the tensile stresses are moderately high at the interface 522 between the fourth and fifth layers 518, 520, almost 300 MPa, but are manageable for a fiber optic connector.

The semi-analytic stress model was again used for a second five-layer structure, where layer 1 (612; FIG. 19) is silica, layer 2 (614) is 50-50% mix of Glass A and glass-ceramic B, layer 3 (616) is 100% Glass A, layer 4 (618) is 45 volume % zirconia-3 mole % yttria plus 55% Glass A, and layer 5 (620) is 90% zirconia-3 mole % yttria plus the remaining 10% being Glass A.

FIG. 19 shows the approximate circumferential stress distribution 610 through the layers 612, 614, 616, 618, 620, assuming the five-layer body was sintered at 800° C. and cooled to 0° C., with no stress relaxation. Table II below contains the relevant estimated properties. As can be seen, the stresses are higher than the first case (shown in FIG. 19) due to the larger thermal expansion difference and the higher elastic modulus. The highest tensile stress is at the interface 622 between the fourth and fifth layers 618, 620, about 550 MPa, but is still manageable for a fiber optic connector.

The stresses shown on the graph of FIG. 19 are approximant for several reasons. First, real-world interfaces are not mathematically sharp, there is a jumble of composition visible in the SEM micrographs along the interface between two compositions, which will smooth the sharp stress peaks somewhat. Secondly, the various composition layers are modeled as materials with uniform thermal expansion and elastic properties, which is not the case for the real-world materials having a combination of ceramic particles (agglomerates) and glass. The stresses in the glass near the ceramic particles and agglomerates is not uniform and the macro stresses are overlaid upon the micro-thermal expansion stresses.

TABLE II

| Layer # | Young's elastic modulus GPa | Poisson's ratio | Thermal expansion /° C. | Layer outer radii mm |
|---|---|---|---|---|
| 1 | 72.9 | 0.14 | $5.5 \times 10^{-7}$ | 0.19 |
| 2 | 73 | 0.3 | $3.5 \times 10^{-6}$ | 0.4 |
| 3 | 73 | 0.3 | $7 \times 10^{-6}$ | 0.6 |
| 4 | 134 | 0.3 | $9.4 \times 10^{-6}$ | 0.8 |
| 5 | 196 | 0.3 | $11.5 \times 10^{-6}$ | 1.25 |

Example I-z

Figure 20:
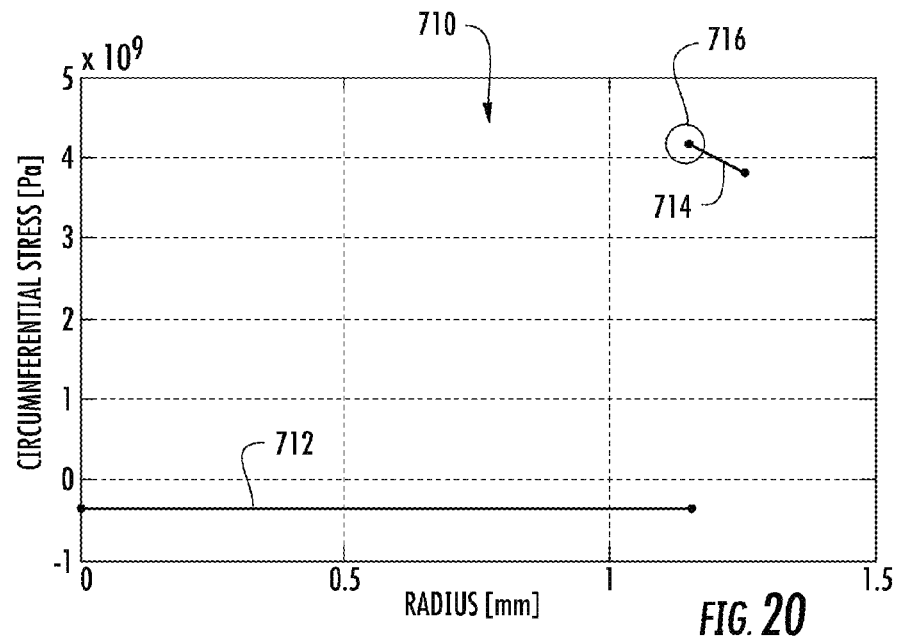
FIGS. 20 and 21 are plots of estimated macro-stresses in two-layer ferrules.
Figure 21:
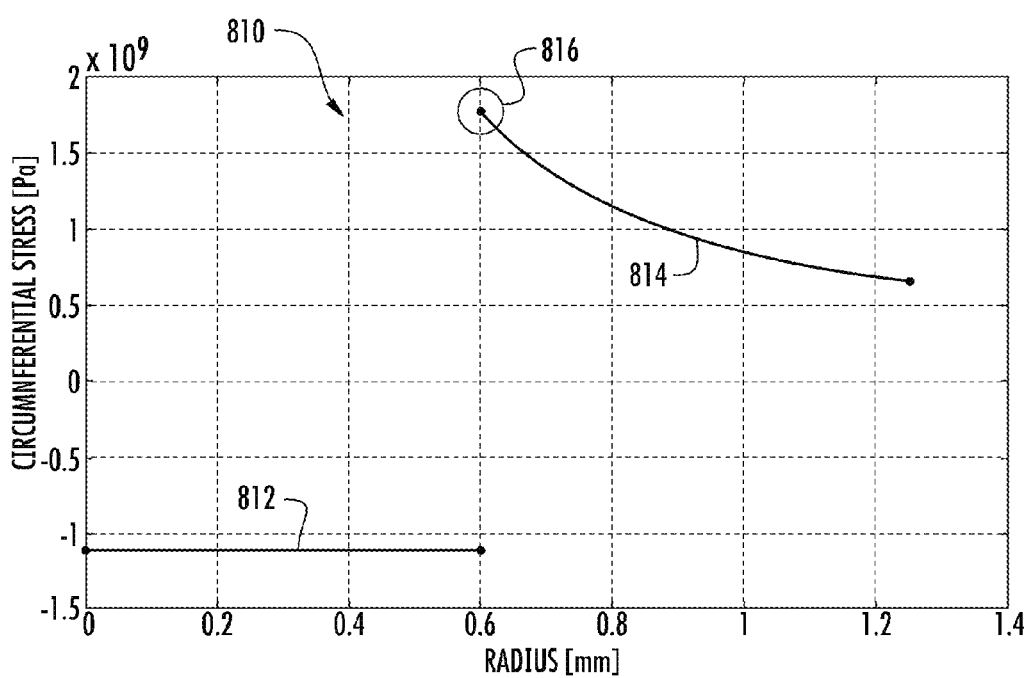

Referring to FIGS. 20 and 21, using the same semi-analytic stress model, the circumferential stresses in a 2-layer ferrule were calculated for comparison and contextual purposes. Table III below shows values entered into the stress model. The first layer 712 was assumed to be silica. Poisson's ratio was estimated to be 0.3 for the second layer 714, and the Young's elastic modulus and the thermal expansion coefficient are that of 100% zirconia-3 mole % yttria.

TABLE III

| Layer # | Young's elastic modulus GPa | Poisson's ratio | Thermal expansion /° C. | Layer outer radii mm |
|---|---|---|---|---|
| 1 | 72.9 | 0.14 | $5.5 \times 10^{-7}$ | 1.15 |
| 2 | 210 | 0.3 | $12 \times 10^{-6}$ | 1.25 |

FIG. 20 shows the approximate circumferential stress distribution 710 through the layers 712, 714, assuming the 2-layer body was sintered at 1500° C. and cooled to 0° C., with no stress relaxation. As can be seen, the tensile stresses are extremely high at the interface 716 between the two layers 712, 716, greater than 4000 MPa, which may cause a composite ferrule to shatter.

Example II-z

Using the semi-analytic stress model once again, circumferential stresses in a 2-layer ferrule were calculated. Table IV below shows values entered into the approximate stress model. The first layer 812 was assumed to be silica. The Poisson's ratio was estimated to be 0.3 for the second layer 814, and the Young's elastic modulus and the thermal expansion coefficient are that of 100% zirconia-3 mole % yttria. With this second two-layer model, instead of a thin coating, the zirconia outer layer 814 was substantially thicker.

FIG. 21 shows the approximate circumferential stress distribution 810, assuming the 2-layer body was sintered at 1500° C. and cooled to 0° C., with no stress relaxation. As can be seen, the tensile stresses are extremely high at the interface 816 between the two layers 812, 814, greater than about 1800 MPa and the compressive stress on the silica interior is very high, over 1000 MPa. A composite ferrule made this way may shatter.

TABLE IV

| Layer # | Young's elastic modulus GPa | Poisson's ratio | Thermal expansion /° C. | Layer outer radii mm |
|---|---|---|---|---|
| 1 | 72.9 | 0.14 | $5.5 \times 10^{-7}$ | 0.6 |
| 2 | 210 | 0.3 | $12 \times 10^{-6}$ | 1.25 |

Example 5

Zirconia-3 mole % yttria pre-sintered agglomerates 912 were mixed with 37.5 volume % Glass A 914. The mixed powder was spread in a steel die and uni-axially pressed. The sample pre-form was placed in a latex iso-pressing bag, the air was removed by a vacuum pump, and the bag was sealed. The sample was cold iso-statically pressed to about 25 kpsi. The pressed sample was placed on coarse alumina "setter" sand in an alumina sagger box and sintered at 900° C. in air for 4 hours.

Figure 22:
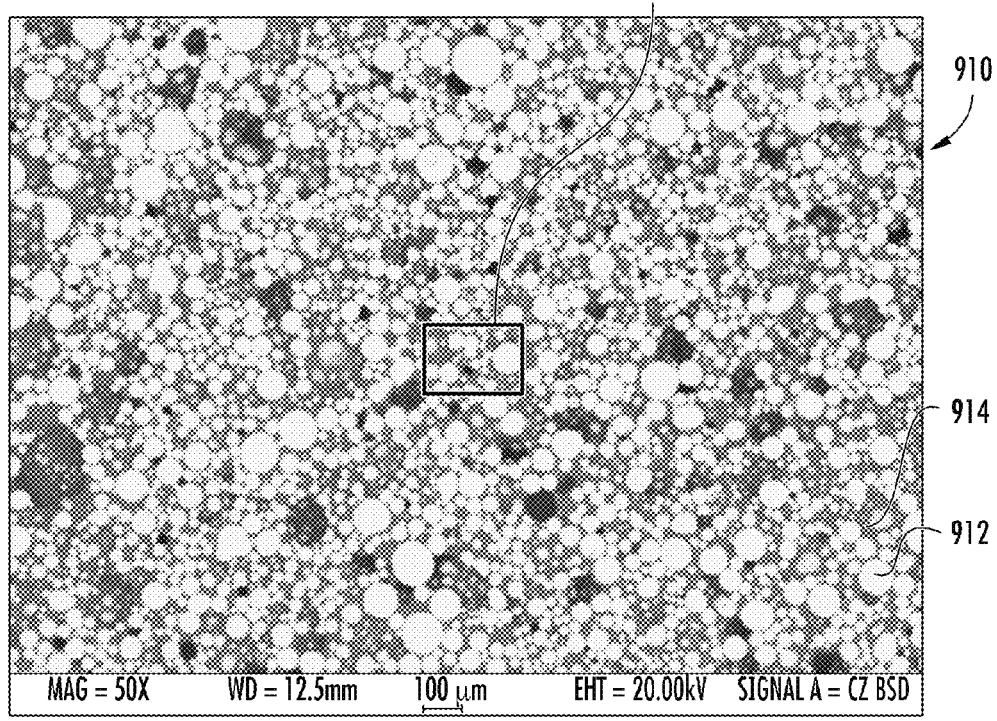
FIGS. 22-30 are SEM micrographs showing material microstructure according to exemplary embodiments.
Figure 23:
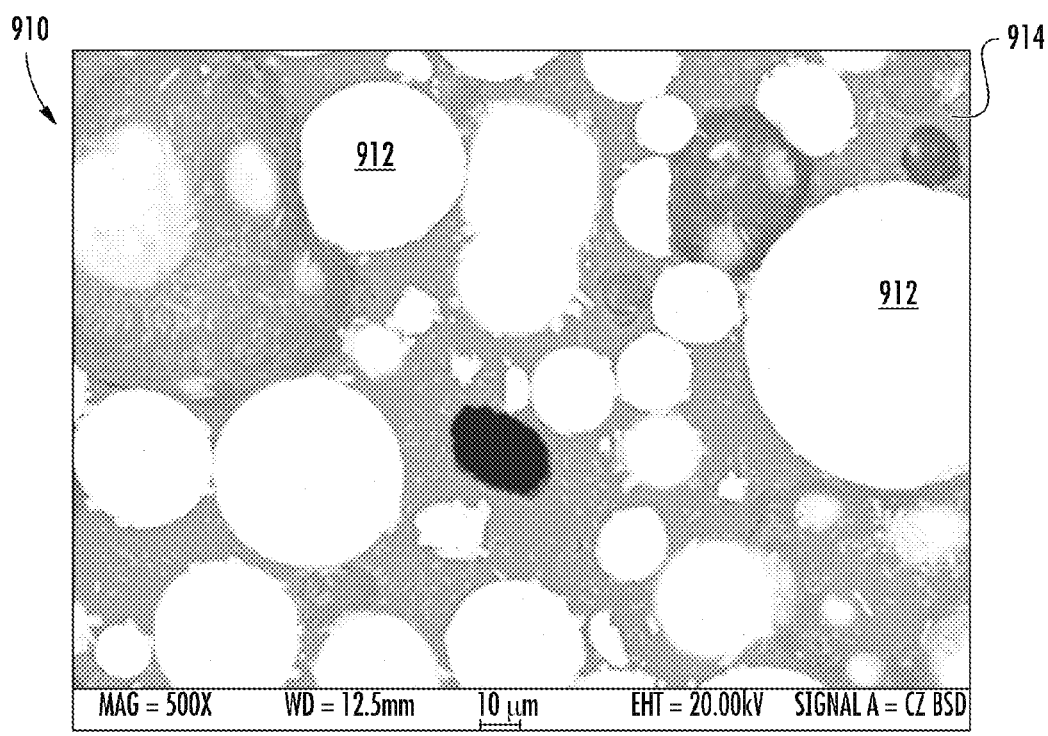

The sample 910 was cut, polished and examined by SEM. FIGS. 22 and 23 show the cross-section microstructure of 62.5% zirconia agglomerates plus 37.5% Glass A.

Example 6

Commercial optical waveguide ferrules including zirconia may be toughened via phase transformation toughening. However, when materials for ferrule disclosed herein are sintered at temperatures below about 1250° C., the phases and grain size may not develop sufficiently to allow for transformation toughening. Furthermore, having significant glass as part of the ferrule composition can change the nano stresses at the grain boundary, which appear to play a role in nucleation of monoclinic zirconia under an external stress field.

To facilitate transformation toughening with materials disclosed herein, a survey of agglomerate pre-sintering temperatures and zirconia yttria dopant levels was performed. Zirconia compositions were used without pre-sintering or with pre-sintering of the agglomerates at 1300° C. to 1550° C. for two hours in air. The zirconia types tested included TZ0Y, zirconia without any dopant, TZ2Y, zirconia-2 mole % yttria, and TZ3Y, zirconia with 3 mole % yttria. The pre-sintered agglomerates were mixed with 50 volume % Glass A. The mixed powder was spread in a steel die and uni-axially pressed. The sample pre-form was placed in a latex iso-pressing bag, the air was removed by a vacuum pump, and the bag was sealed. The sample was cold iso-statically pressed to about 25 kpsi. The pressed sample was placed on coarse alumina "setter" sand in an alumina sagger box and sintered at about 800-900° C. in air for 4 hours. 2.5 cm square cross-section bars, about 6 inches in length, were pressed and sintered. The samples were machined into chevron notched short bar KIC specimens and room temperature KIC measured. The samples were polished and examined by SEM and X-ray diffraction showed phases in the samples.

Figure 24:
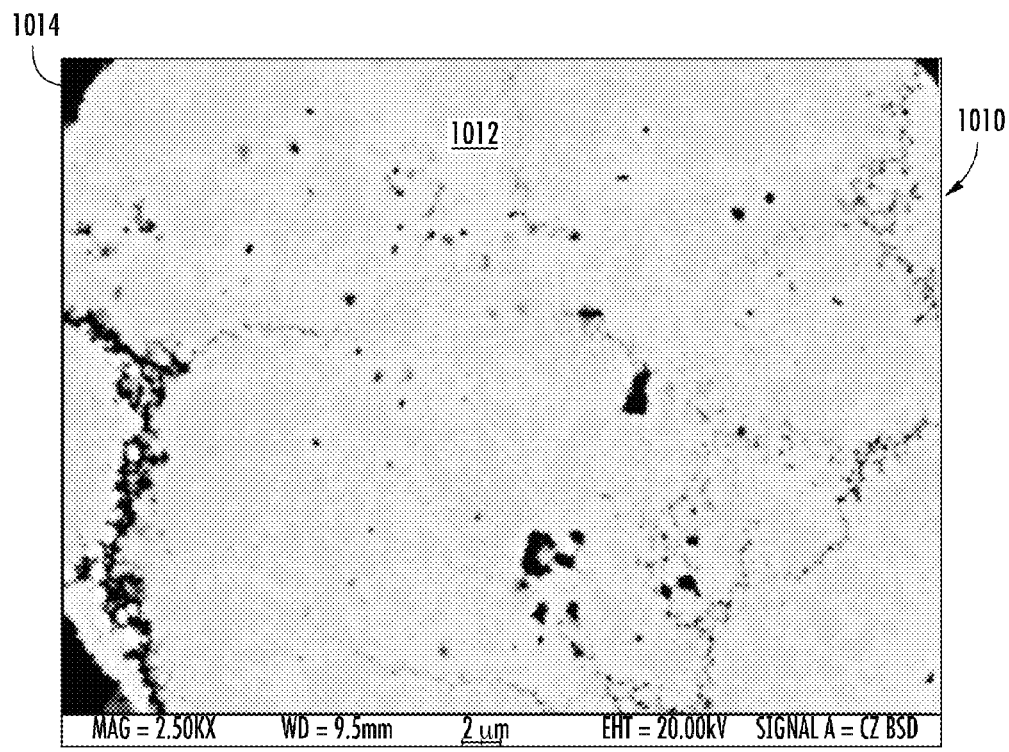
Figure 25:
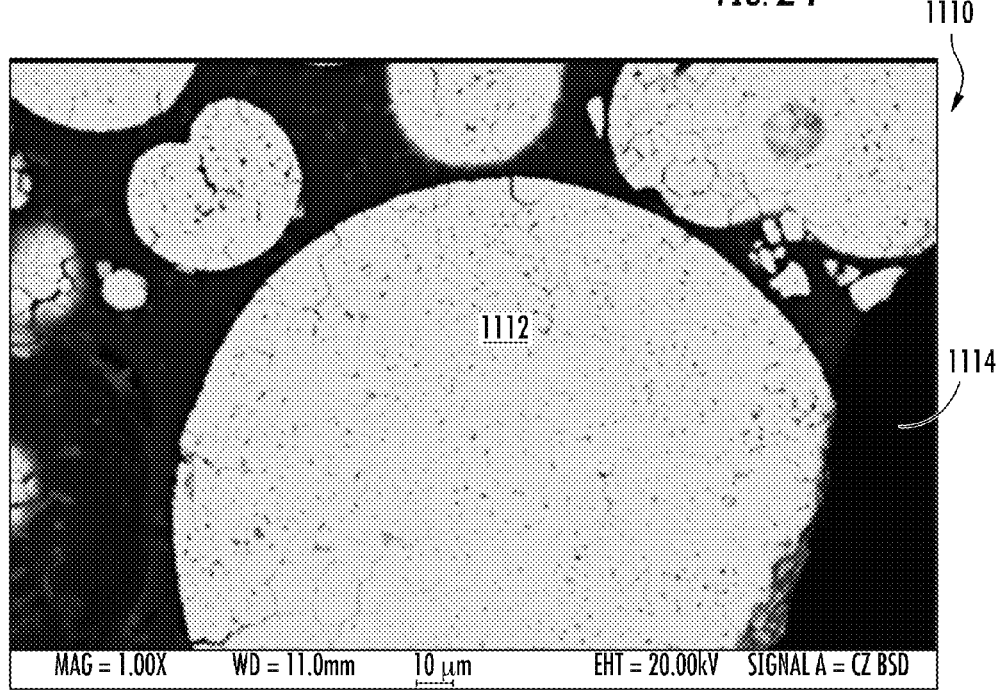
Figure 26:
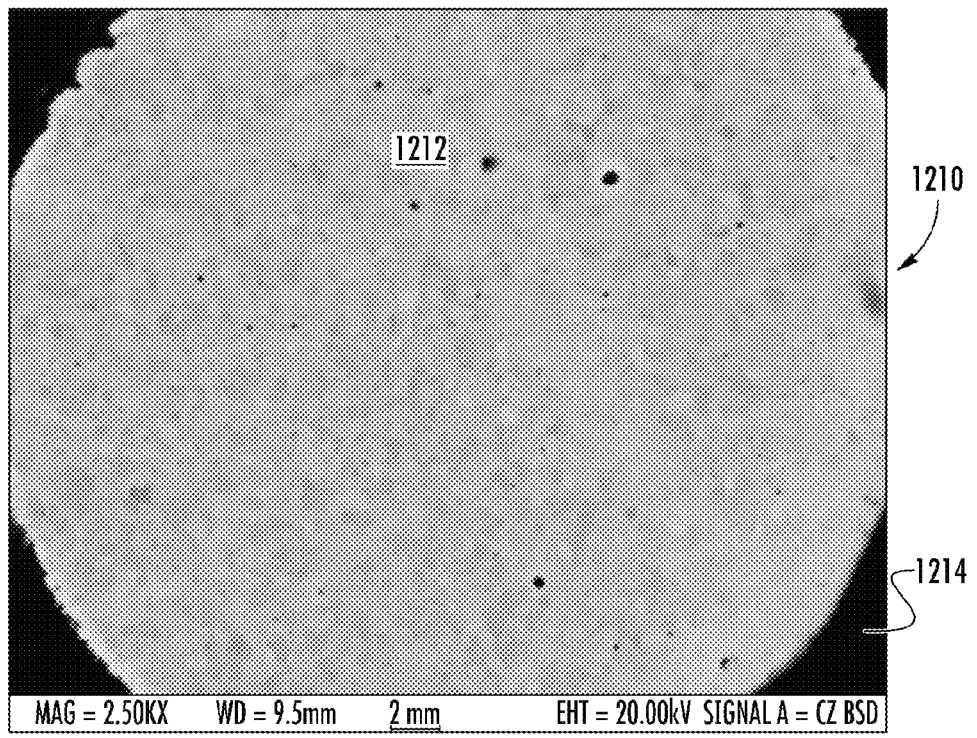
Figure 27:
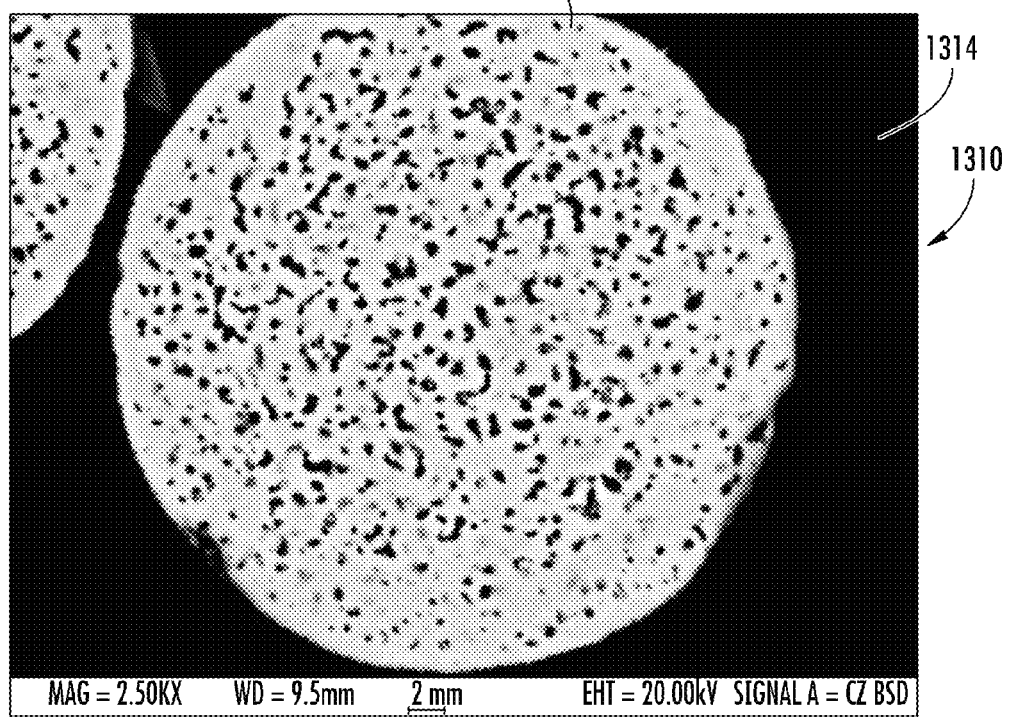
Figure 28:
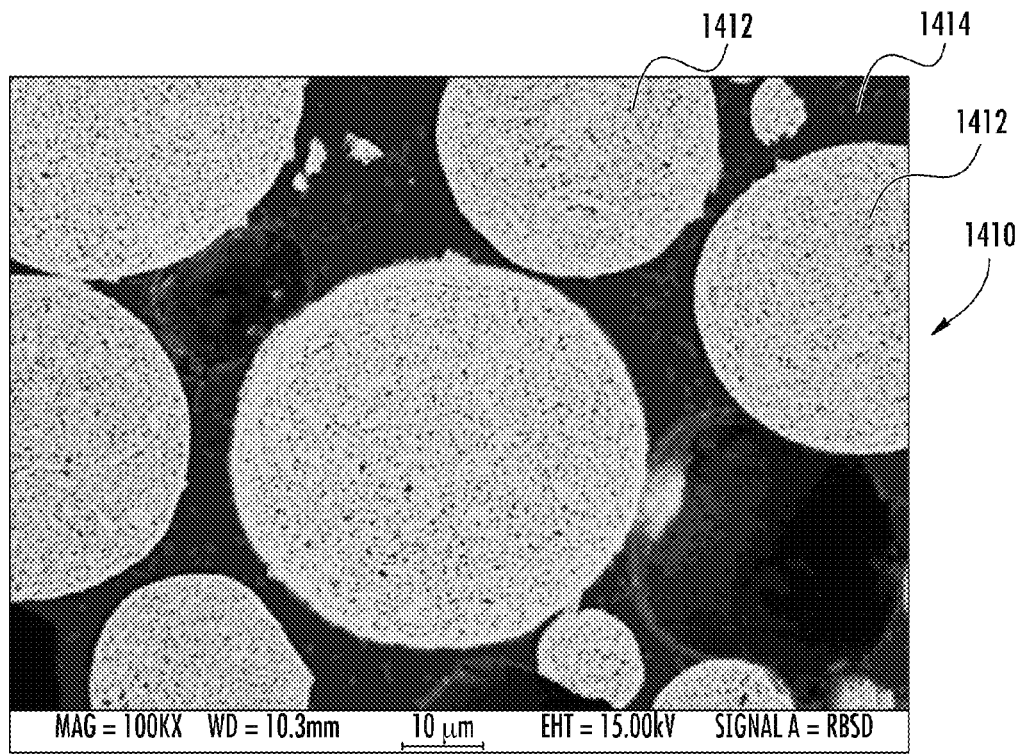
Figure 29:
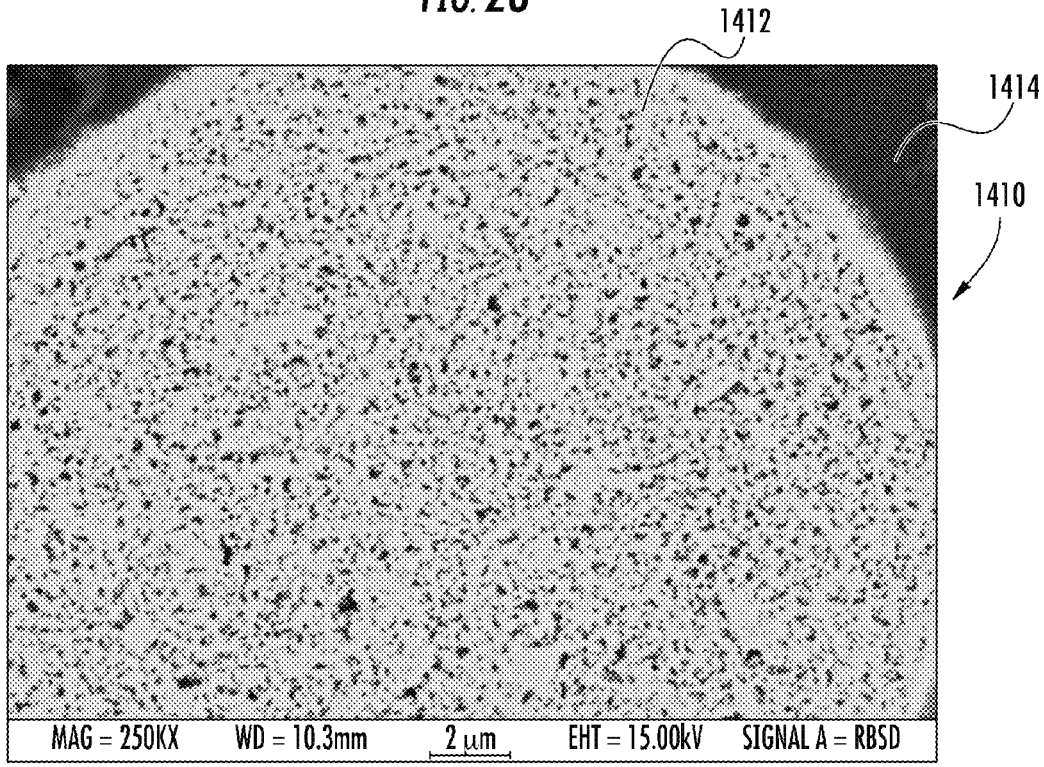
Figure 30:
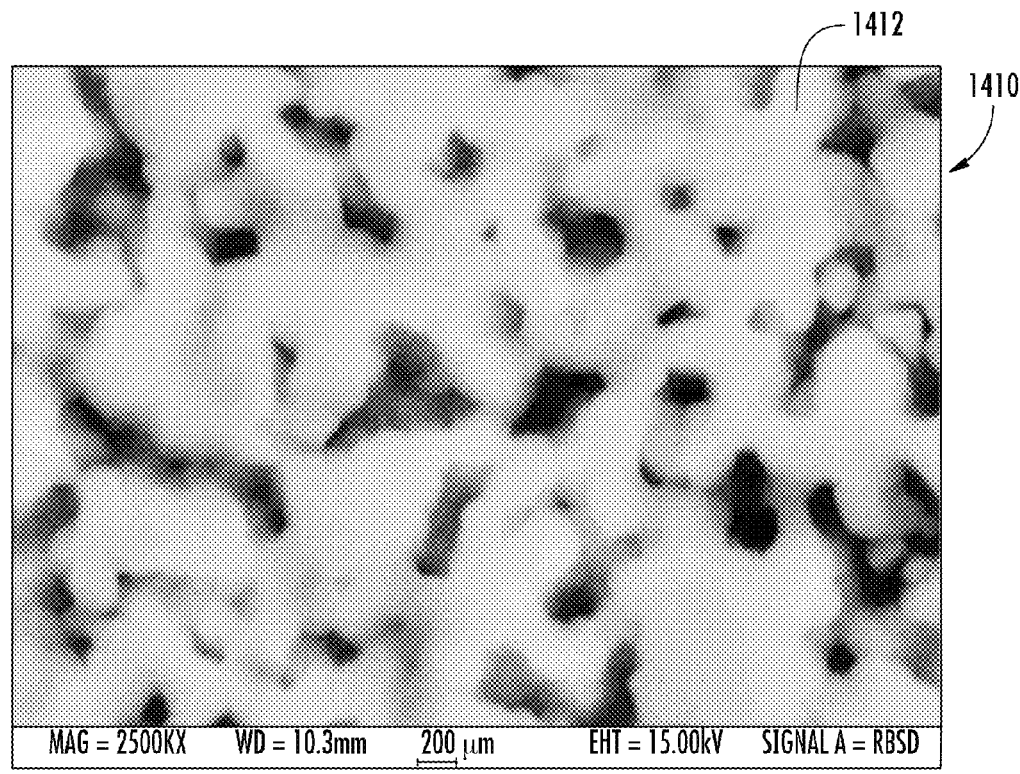

Table V below summarizes the testing, and FIGS. 24-30 show the results. FIG. 24 includes an SEM micrograph 910 of 2Y ZrO$_2$ (1012) pre-sintered at 1500° C. in 50 volume % Glass A (1014) sintered at 900° C. with KIC about 1.8 MPa m$^{1/2}$. FIG. 25 includes an SEM 1110 of 0Y ZrO$_2$ (1112) in 50% Glass A (1114) sintered 900° C. with KIC about 1.3 MPa m$^{1/2}$. FIG. 26 includes an SEM 1210 of 3Y ZrO$_2$ (1212) pre-sintered at 1550° C. in 50% Glass A (1214) sintered 900° C. with KIC about 1.28 MPa m$^{1/2}$. FIG. 27 includes an SEM 1310 of 3Y ZrO$_2$ (1312) pre-sintered at 1400° C. in 50% Glass A (1314). FIGS. 28-30 include SEM 1410 of 3Y ZrO$_2$ (1412) pre-sintered at 1300° C. plus 50% Glass A (1414) sintered 900° C. with KIC about 1.6 MPa m$^{1/2}$.

TABLE V

| sample | Yttria level in Zirconia Mole % | Composition | Zirconia pre-sinter temperature ° C. | Sintering Temperature ° C. | Monoclinic level | Fracture toughness KIC MPa(m)$^{1/2}$ |
|---|---|---|---|---|---|---|
| alpha | 0 | | 1500 | 900 | high | 1.3 |
| beta | 2 | | 1500 | 900 | medium | 1.8 |
| gamma | 3 | | 1550 | 900 | low | 1.3 |
| delta | 3 | | 1400 | 900 | low | — |
| Eta | 3 | | 1300 | 900 | Very low | 1.6 |

It was found that agglomerates that were not pre-sintered, when sintered with 50 volume % Glass A at about 800-900° C. showed no sign of transformation toughening. Pre-sintered TZ0Y resulted in monoclinic zirconia and a fairly low KIC. Pre-sintered TZ3Y showed tetragonal zirconia with only a low amount of monoclinic in the x-ray pattern. TZ2Y pre sintered at 1500° C. showed a medium amount of monoclinic zirconia and an improved toughness, 1.8 MPa (m)$^{1/2}$. Accordingly, the preferred amount of yttria dopant in the zirconia is above 0 but 3 vol. % or lower for some such embodiments. As shown in FIGS. 28-30, the SEM micrographs 1410 show that sintering the loose agglomerates 1412 results in porous agglomerates 1412 at 1300° C. and 1400° C.

Figure 31:
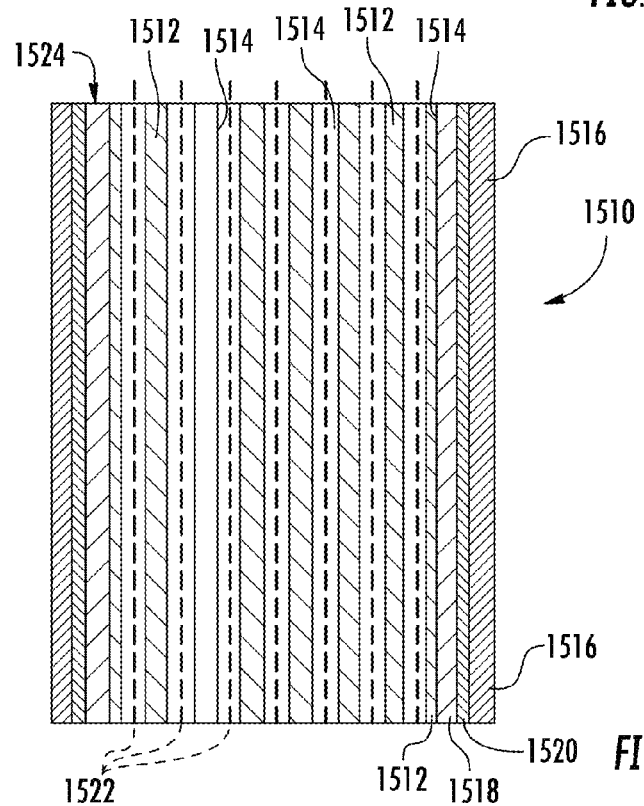
FIG. 31 is a schematic diagram of multi-fiber ferrule in cross-section according to an exemplary embodiment.

Referring now to FIG. 31, in some embodiments a multi-fiber ferrule 1510 is manufactured and used according to the above disclosure. Accordingly, in some such embodiments, the multi-fiber ferrule 1510 includes a low-expansion material 1512 (e.g., glass) coupled to an interior thereof and having a bore(s) 1514 defined therein, a higher-expansion material 1516 (e.g., zirconia) on the exterior of the ferrule 1510, and one or more graded transition layers 1518, 1520 therebetween, as disclosed herein. The interior 1512 may include more than one bore 1514 to receive multiple optical fibers 1522, where the low-expansion material 1512 forming each bore 1514 may be connected or separated into isolated bore-forming tubes, partitioned by the one or more transition layers.

As shown in FIG. 31, each bore 1514 supports an optical fiber 1522, where the bore 1514 is formed in a first material 1512 (e.g., glass, silica). The first material 1512 is surrounded by a second material 1518 (e.g., porous inorganic material), which is itself surrounded by a third material 1516 (e.g., typical zirconia ferrule materials). The second material 1518 may provide stress-isolation having higher porosity and/or lower elastic modulus relative to the first 1512 and third materials 1516, as further disclosed above with regard to other embodiments. In some embodiments, the ferrule 1510 includes additional intermediate layers 1518, 1520 between the bore 1514 and exterior 1516, which provided a graded transition with respect to coefficient of thermal expansion, modulus of elasticity, and/or other parameters, whereby stresses are disrupted and/or distributed to reduce peak stresses. The multi-fiber ferrule 1510 may support two, four, eight, twelve, sixteen, twenty-four, thirty-two, or other numbers of optical fibers 1522. In some embodiments, the multi-fiber ferrule 1510 is rectilinear, and the end face 1524 is generally rectangular.

It was mentioned above how the same laser(s) used to thermally expand the ferrule and/or fuse the optical fiber to the ferrule may additionally be used to form an optical surface on an end portion of the optical fiber. To this end, the laser or laser may be considered to be part of a laser cleaving system. Laser cleaving steps may be performed before fusing the optical fiber to the ferrule or afterwards. Indeed, unless otherwise expressly stated, it is in no way intended that any method set forth herein be construed as requiring that steps be performed in a specific order. Accordingly, where a method claim below does not actually recite an order to be followed by its steps or it is not otherwise specifically stated in the claims below or description above that the steps are to be limited to a specific order, it is no way intended that any particular order be inferred.

It will be apparent to those skilled in the art that additional modifications and variations can be made without departing from the spirit or scope of the claims below. For example, although ferrules comprising a ceramic material and optical fibers comprising silica are mentioned above, some claims may not be limited to these materials. The methods described above may also be applicable to plastic ferrules and optical fibers. Other modifications, combinations, sub-combinations, and variations of the disclosed embodiments may occur to persons skilled in the art, yet still fall within the scope of the claims below.

What is claimed is:

1. A method of securing an optical fiber to a ferrule, comprising:
   heating the ferrule to cause thermal expansion, wherein a ferrule bore of the ferrule increases in diameter as a result of the thermal expansion;
   inserting the optical fiber into the ferrule bore;
   cooling the ferrule after thermal expansion and after inserting the optical fiber into the ferrule bore so that the ferrule bore decreases in diameter and forms a mechanical interface with the optical fiber; and
   fusing the optical fiber to the ferrule by irradiating the optical fiber and the ferrule with laser energy;
   wherein heating the ferrule to cause thermal expansion comprises irradiating the ferrule with laser energy; and
   wherein at least one common laser source is used to heat the ferrule to cause thermal expansion and to fuse the optical fiber to the ferrule, the method further comprising:
   changing at least one optical delivery property of the at least one common laser source after heating the ferrule and before fusing the optical fiber to the ferrule.

2. A method according to claim 1, wherein inserting the optical fiber into the ferrule bore comprises extending an end portion of the optical fiber beyond a front end face of the ferrule, the method further comprising:

operating the at least one common laser source to form an optical surface on the end portion of the optical fiber after extending the end portion of the optical fiber beyond the front end face of the ferrule.

3. A method according to claim 2, wherein the at least one common laser source is operated to form the optical surface on the end portion of the optical fiber after fusing the optical fiber to the ferrule.

4. A method according to claim 3, wherein before operating the at least one common laser source to form the optical surface but after fusing the optical fiber to the ferrule, the method further comprises:

changing at least one optical delivery property of the at least one common laser source.

5. A method according to claim 1, wherein the optical fiber is only fused to the ferrule at locations at spaced least 1 mm from a front end face of the ferrule.

6. A method according to claim 1, further comprising:

providing the ferrule, wherein the ferrule is comprised of an inorganic composite material having a material gradient in a radial direction from at least 75% by volume of a first inorganic material to at least 75% by volume of a second inorganic material.

7. A method according to claim 6, wherein the first inorganic material comprises a ceramic and the second inorganic material comprises silica.

8. A method according to claim 7, wherein the ceramic material of the ferrule comprises alumina or zirconia.

9. A method according to claim 6, wherein the first inorganic material of the ferrule has a fracture toughness of at least 1 MPa·m½, and further wherein the second inorganic material of the ferrule has a softening point less than 1000° C.

10. A method according to claim 6, wherein the ferrule includes a region extending along at least 1/10 of the length of the radius of the ferrule, and further wherein the material gradient is located within said region.

11. A method according to claim 10, wherein the material gradient of the ferrule is continuous over the region of the ferrule.

12. A method according to claim 1, wherein cooling the ferrule after thermal expansion further comprises forming the mechanical interface between the ferrule bore and optical fiber along an entire length of the ferrule bore.

13. A method according to claim 1, further comprising:

providing the ferrule, wherein the ferrule has a coefficient of thermal expansion at least 15 times greater than a coefficient of thermal expansion of the optical fiber.

14. A method according to claim 1, further comprising:

providing the ferrule, wherein the ferrule bore defines an interior of the ferrule and the ferrule further includes an exterior, and wherein material of the ferrule includes one or more components and is such that the material changes in thermal expansion coefficient from the interior to the exterior of the ferrule, wherein the material of the ferrule between the interior and exterior comprises has an average thermal expansion coefficient greater than the thermal expansion coefficient of the interior of the ferrule and less than the thermal expansion coefficient of the exterior of the ferrule.

15. The method of claim 14, wherein the thermal expansion coefficient of the material changes by way of discrete layers in the material between the interior and exterior of the ferrule.

16. The method of claim 15, wherein the layers are graded such that each outwardly adjoining layer has a greater thermal expansion coefficient.

17. The method of claim 15, wherein the ferrule comprises at least three discrete layers.

18. The method of claim 14, wherein the material of the ferrule is such that the thermal expansion coefficient transitions from less than $30 \times 10^{-7}$/° C. at the interior of the ferrule to greater than $70 \times 10^{-7}$/° C. at the exterior of the ferrule.

* * * * *

UNITED STATES PATENT AND TRADEMARK OFFICE
CERTIFICATE OF CORRECTION

PATENT NO. : 9,880,362 B2  
APPLICATION NO. : 14/686061  
DATED : January 30, 2018  
INVENTOR(S) : Jeffrey Dean Danley et al.

Page 1 of 1

It is certified that error appears in the above-identified patent and that said Letters Patent is hereby corrected as shown below:

On the Title Page

On page 2, Column 1, item (60), Related U.S. Application Data, Line 2, delete "61/716,815," and insert -- 61/713,815, --, therefor.

On page 2, Column 1, item (60), Related U.S. Application Data, Line 3, delete "Oct. 22, 2012." and insert -- Oct. 15, 2012. --, therefor.

On page 2, Column 1, item (56), U.S. Patent Documents, Line 13, delete "5,250,351" and insert -- 5,256,851 --, therefor.

On page 2, Column 2, item (56), U.S. Patent Documents, Line 21, delete "Clarkin" and insert -- Clarkin et al. --, therefor.

On page 2, Column 2, item (56), Other Publications, Line 5, delete "zire" and insert -- zirc --, therefor.

In the Claims

In Column 22, Line 36, Claim 18, delete "30×10-7/° C." and insert -- $30 \times 10^{-7}/° C.$ --, therefor.

In Column 22, Line 37, Claim 18, delete "70×10-7/° C." and insert -- $70 \times 10^{-7}/° C.$ --, therefor.

Signed and Sealed this  
Twenty-fourth Day of December, 2019

Andrei Iancu  
*Director of the United States Patent and Trademark Office*